(12) United States Patent
Yapici et al.

(10) Patent No.: US 12,160,332 B2
(45) Date of Patent: Dec. 3, 2024

(54) SPATIAL EQUALIZATION VIA RECONFIGURABLE INTELLIGENT SURFACE SELECTION

(71) Applicant: QUALCOMM Incorporated, San Diego, CA (US)

(72) Inventors: Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 17/714,451

(22) Filed: Apr. 6, 2022

(65) Prior Publication Data
US 2023/0327923 A1    Oct. 12, 2023

(51) Int. Cl.
*H04L 25/03* (2006.01)
*H04L 5/00* (2006.01)
*H04W 52/02* (2009.01)

(52) U.S. Cl.
CPC ...... *H04L 25/03891* (2013.01); *H04L 5/0048* (2013.01); *H04W 52/0225* (2013.01)

(58) Field of Classification Search
CPC .................................................. H04L 25/03891
See application file for complete search history.

(56) References Cited

U.S. PATENT DOCUMENTS

| | | | |
|---|---|---|---|
| 2019/0053162 A1* | 2/2019 | Islam | H04W 52/0229 |
| 2021/0259020 A1* | 8/2021 | Li | H04B 7/0452 |
| 2021/0384958 A1* | 12/2021 | Denis | H04B 7/145 |
| 2022/0014935 A1* | 1/2022 | Haija | H04L 5/0048 |
| 2023/0030324 A1* | 2/2023 | Ali | H04B 7/0617 |
| 2023/0086903 A1* | 3/2023 | Khojastepour | G01S 3/14 |
| | | | 342/201 |
| 2024/0072849 A1* | 2/2024 | Haija | H04B 7/06952 |

FOREIGN PATENT DOCUMENTS

WO    WO-2023055704 A1 *  4/2023  ........... H04B 7/0626

* cited by examiner

*Primary Examiner* — Abdeltif Ajid
(74) *Attorney, Agent, or Firm* — Holland & Hart LLP

(57) ABSTRACT

Methods, systems, and devices for wireless communications are described. For example, described techniques provide for performing multipath fading equalization at a reconfigurable intelligent surface (RIS), allowing a receiving device to omit an equalization procedure or to perform a simpler equalization. A transmitting device, such as a network entity, may select a RIS that is within a sufficient proximity to a receiving device, such as a user equipment (UE), that multipath fading of the RIS to receiver wireless link is likely to be below a threshold. The network entity may configure the selected RIS with a phase matrix to perform over-the-air equalization to compensate for multipath fading over the network entity to RIS wireless link. The UE may omit an equalization procedure or may perform a simpler equalization procedure as compared to a scenario where the RIS does not compensate for multipath fading.

30 Claims, 21 Drawing Sheets

SPATIAL EQUALIZATION VIA RECONFIGURABLE INTELLIGENT SURFACE SELECTION

FIELD OF TECHNOLOGY

The following relates to wireless communications, including spatial equalization via reconfigurable intelligent surface selection.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support spatial equalization via reconfigurable intelligent surface (RIS) selection. For example, the described techniques provide for performing multipath fading equalization at a RIS to allow a receiving device to omit an equalization procedure or to perform a simpler and less energy-intensive and computationally expensive equalization. A transmitting device, such as a network entity, may select a RIS that is within a sufficient proximity to a receiving device, such as a user equipment (UE), that multipath fading of the RIS to receiver wireless link below, or is likely to be below, a threshold. The network entity may configure the selected RIS with a phase matrix to perform over-the-air equalization to compensate for multipath fading over the network entity to RIS wireless link. Because the RIS compensates for multipath fading, the UE may omit an equalization procedure or may perform a simpler equalization procedure as compared to a scenario where the RIS does not compensate for multipath fading in the wireless link between the network entity and the RIS. The network entity may transmit a reference signal to the UE via the RIS. The UE may measure the reference signal separately with equalization and without equalization at the UE to determine the fading characteristic (e.g., the flatness) of the wireless link between the UE and the RIS. The UE may report the fading characteristic of the wireless link between the UE and the RIS to the network entity. If the wireless link between the UE and the RIS is sufficiently flat, the UE may communicate with the network entity via the RIS without performing equalization at the UE. If the wireless link between the UE and the RIS is not sufficiently flat, the UE may either perform an equalization procedure that is simpler than a scenario where the RIS does not compensate for multipath fading in the wireless link between the network entity and the RIS or the UE may communicate with the network entity without using the RIS. In some cases, the RIS may perform equalization based on the UE entering an energy saving mode. The UE may transmit a message to the network entity indicating that the UE is entering the energy saving mode. In response, the network entity may configure a RIS to perform equalization of a wireless link between the network entity and the RIS and transmit a reference signal to the UE via the RIS. Accordingly, the UE may save energy while operating in the energy saving mode by omitting an equalization procedure completely, or by performing a simplified equalization procedure, for communications with a network entity.

A method for wireless communications at a user equipment (UE) is described. The method may include receiving a reference signal from a network entity via a wireless link between a RIS and the UE, determining, based on the reference signal, a value associated with a fading characteristic for the wireless link, and transmitting, to the network entity, a message including an indication of the value associated with the fading characteristic for the wireless link.

An apparatus for wireless communications at a UE is described. The apparatus may include a processor, memory coupled with the processor, and instructions stored in the memory. The instructions may be executable by the processor to cause the apparatus to receive a reference signal from a network entity via a wireless link between a RIS and the UE, determine, based on the reference signal, a value associated with a fading characteristic for the wireless link, and transmit, to the network entity, a message including an indication of the value associated with the fading characteristic for the wireless link.

Another apparatus for wireless communications at a UE is described. The apparatus may include means for receiving a reference signal from a network entity via a wireless link between a RIS and the UE, means for determining, based on the reference signal, a value associated with a fading characteristic for the wireless link, and means for transmitting, to the network entity, a message including an indication of the value associated with the fading characteristic for the wireless link.

A non-transitory computer-readable medium storing code for wireless communications at a UE is described. The code may include instructions executable by a processor to receive a reference signal from a network entity via a wireless link between a RIS and the UE, determine, based on the reference signal, a value associated with a fading characteristic for the wireless link, and transmit, to the network entity, a message including an indication of the value associated with the fading characteristic for the wireless link.

Some examples of the method, apparatuses, and non-transitory computer-readable medium described herein may further include operations, features, means, or instructions for receiving, from the network entity, control signaling indicating a set of resources for receiving the reference signal.

Some examples of the method, apparatuses, and non-transitory computer-readable medium described herein may further include operations, features, means, or instructions for receiving, from the network entity at least in part in response to the indication of the value associated with the fading characteristic, control signaling indicating the RIS.

Some examples of the method, apparatuses, and non-transitory computer-readable medium described herein may further include operations, features, means, or instructions for transmitting, to the network entity, a control message indicating that the UE may be transitioning to an energy saving mode, where the reference signal may be received from the network entity at least in part in response to the control message.

Some examples of the method, apparatuses, and non-transitory computer-readable medium described herein may further include operations, features, means, or instructions for transitioning to the energy saving mode based on one of a remaining battery life of the UE or a change of serving carrier frequency band.

Some examples of the method, apparatuses, and non-transitory computer-readable medium described herein may further include operations, features, means, or instructions for communicating with the network entity via a first transmit beam prior to transmitting the control message, where the reference signal may be received via a second transmit beam.

In some examples of the method, apparatuses, and non-transitory computer-readable medium described herein, determining the value associated with the fading characteristic may include operations, features, means, or instructions for identifying a power difference between a first received power measurement of the reference signal without equalization at the UE and a second received power measurement of the reference signal with equalization at the UE.

Some examples of the method, apparatuses, and non-transitory computer-readable medium described herein may further include operations, features, means, or instructions for applying a first equalization process at the UE to communicate directly with the network entity and applying a second equalization process at the UE to communicate with the network entity via the RIS, the second equalization process different from the first equalization process and based on the fading characteristic.

In some examples of the method, apparatuses, and non-transitory computer-readable medium described herein, the second equalization process includes an absence of an equalization process at the UE to communicate with the network entity.

In some examples of the method, apparatuses, and non-transitory computer-readable medium described herein, the second equalization process may be associated with a simplified equalization process relative to the first equalization process.

Some examples of the method, apparatuses, and non-transitory computer-readable medium described herein may further include operations, features, means, or instructions for receiving, from the network entity, control signaling indicating a set of resources for transmission by the UE of a second reference signal for selection by the network entity of a second RIS for uplink communications and transmitting, to the network entity via the second RIS, the second reference signal on the set of resources.

In some examples of the method, apparatuses, and non-transitory computer-readable medium described herein, the reference signal includes a preamble sequence.

A method for wireless communications at a network entity is described. The method may include transmitting a reference signal to a UE via a RIS, receiving, from the UE at least in part in response to the reference signal, a message including an indication of a value associated with a fading characteristic for a wireless link between the RIS and the UE, and transmitting to the UE via the RIS based on the value associated with the fading characteristic for the wireless link.

An apparatus for wireless communications at a network entity is described. The apparatus may include a processor, memory coupled with the processor, and instructions stored in the memory. The instructions may be executable by the processor to cause the apparatus to transmit a reference signal to a UE via a RIS, receive, from the UE at least in part in response to the reference signal, a message including an indication of a value associated with a fading characteristic for a wireless link between the RIS and the UE, and transmit to the UE via the RIS based on the value associated with the fading characteristic for the wireless link.

Another apparatus for wireless communications at a network entity is described. The apparatus may include means for transmitting a reference signal to a UE via a RIS, means for receiving, from the UE at least in part in response to the reference signal, a message including an indication of a value associated with a fading characteristic for a wireless link between the RIS and the UE, and means for transmitting to the UE via the RIS based on the value associated with the fading characteristic for the wireless link.

A non-transitory computer-readable medium storing code for wireless communications at a network entity is described. The code may include instructions executable by a processor to transmit a reference signal to a UE via a RIS, receive, from the UE at least in part in response to the reference signal, a message including an indication of a value associated with a fading characteristic for a wireless link between the RIS and the UE, and transmit to the UE via the RIS based on the value associated with the fading characteristic for the wireless link.

Some examples of the method, apparatuses, and non-transitory computer-readable medium described herein may further include operations, features, means, or instructions for transmitting, to the UE, control signaling indicating a set of resources for receiving the reference signal.

Some examples of the method, apparatuses, and non-transitory computer-readable medium described herein may further include operations, features, means, or instructions for transmitting, to the UE at least in part in response to the indication of the value associated with the fading characteristic, control signaling indicating the RIS.

Some examples of the method, apparatuses, and non-transitory computer-readable medium described herein may further include operations, features, means, or instructions for selecting the RIS based on a location of the UE.

Some examples of the method, apparatuses, and non-transitory computer-readable medium described herein may further include operations, features, means, or instructions for selecting the RIS based on one of an angle diversity associated with the RIS and the UE, an angular position associated with the RIS and the UE, or a geometric relation associated with the RIS and the UE.

Some examples of the method, apparatuses, and non-transitory computer-readable medium described herein may further include operations, features, means, or instructions for selecting an antenna port for transmitting the reference signal based on the RIS.

Some examples of the method, apparatuses, and non-transitory computer-readable medium described herein may further include operations, features, means, or instructions for receiving, from the UE, a control message indicating that the UE may be transitioning to an energy saving mode, where the reference signal may be transmitted at least in part in response to the control message.

Some examples of the method, apparatuses, and non-transitory computer-readable medium described herein may further include operations, features, means, or instructions for transmitting, to the RIS, a phase matrix for equalization of a second wireless link between the network entity and the RIS.

Some examples of the method, apparatuses, and non-transitory computer-readable medium described herein may further include operations, features, means, or instructions for transmitting to the UE via the RIS based on the value associated with the fading characteristic being less than a threshold.

Some examples of the method, apparatuses, and non-transitory computer-readable medium described herein may further include operations, features, means, or instructions for transmitting directly with the UE based on the value associated with the fading characteristic being greater than a threshold.

Some examples of the method, apparatuses, and non-transitory computer-readable medium described herein may further include operations, features, means, or instructions for transmitting, to the UE, a control message indicating for the UE to apply equalization to the wireless link based on the fading characteristic being greater than a threshold.

Some examples of the method, apparatuses, and non-transitory computer-readable medium described herein may further include operations, features, means, or instructions for transmitting, to the UE, control signaling indicating a set of resources for transmission by the UE of a second reference signal for selection by the network entity of a second RIS for uplink communications, receiving, from the UE via the second RIS, the second reference signal, and receiving uplink communications from the UE via the second RIS based on a second fading characteristic for a second wireless link between the second RIS and the network entity, the second fading characteristic based on the second reference signal.

DETAILED DESCRIPTION

Figure 1:
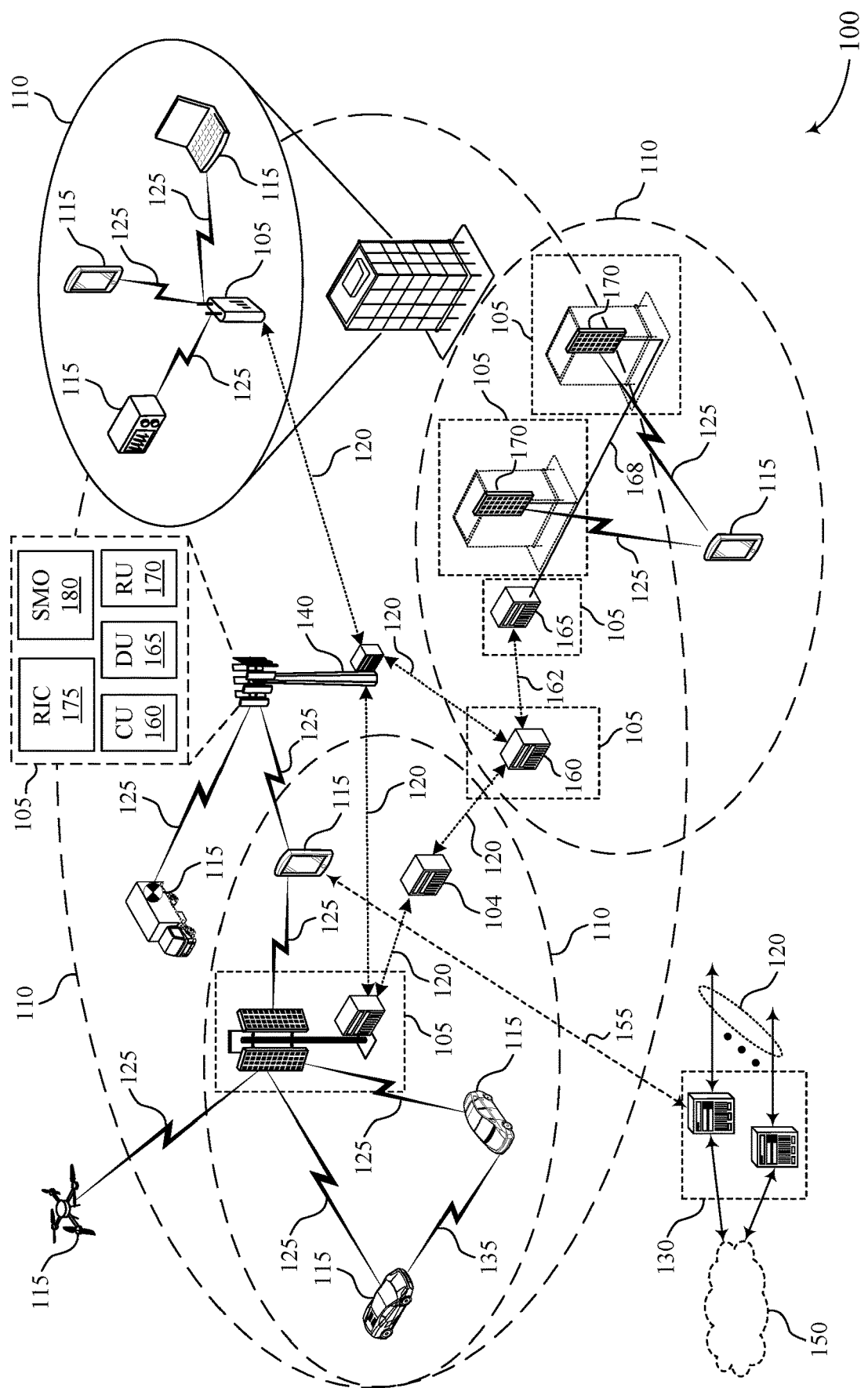
FIG. 1 illustrates an example of a wireless communications system that supports spatial equalization via reconfigurable intelligent surface (RIS) selection in accordance with one or more aspects of the present disclosure.

Some wireless communications systems may employ reconfigurable intelligent surfaces (RISs) to extend or improve wireless communications coverage. A RIS is composed of an array of passive and reconfigurable reflecting elements, and control circuitry capable of establishing wireline/wireless links with a network node (to reconfigure its reflecting elements). RIS may improve spectral efficiency and extend coverage by reflecting beams around blockages via new multipaths so that a network entity may serve a user equipment (UE) in the presence of the blockages. RISs may be associated with low deployment costs. New multipaths introduced by a RIS may also establish favorable propagation features. The phase (and amplitude, if pertinent) that each RIS scattering element introduces to the impinging signal may be chosen to accomplish communications tasks such as beamforming, multipath mitigation, or Doppler compensation. Multipath fading occurs when a signal reaches a receiver over multiple paths, and the relative strengths and phases of the signal over the multiple paths is different. Multipath fading may cause signal distortion, and accordingly the multipath fading over a transmitter to RIS and/or RIS to receiver may impact communications performance. However, resolving multipath fading at a receiving device (e.g., a UE for downlink transmissions or a network entity for uplink transmissions) via an equalization procedure may be energy-intensive and computationally expensive.

The present disclosure relates to performing multipath fading equalization at a MS to allow a receiving device to omit an equalization procedure or to perform a simpler and less energy-intensive and computationally expensive equalization. A transmitting device, such as a network entity, may select a MS that is within a sufficient proximity to a receiving device, such as a UE, that multipath fading of the MS to receiver wireless link is likely to be below a threshold. The network entity may configure the selected RIS with a phase matrix to perform over-the-air equalization to compensate for multipath fading over the network entity to RIS wireless link. Because the RIS compensates for multipath fading, the UE may omit an equalization procedure or may perform a simpler equalization procedure as compared to a scenario where the RIS does not compensate for multipath fading in the wireless link between the network entity and the RIS. To confirm that the wireless link between the RIS and the UE is flat fading, the network entity may transmit a reference signal (e.g., a known preamble sequence) to the UE via the RIS. The UE may measure the reference signal separately with equalization and without equalization at the UE to determine the fading characteristic (e.g., the flatness) of the wireless link between the UE and the RIS. The UE may report the fading characteristic of the wireless link between the UE and the RIS to the network entity. If the wireless link between the UE and the RIS is sufficiently flat (e.g., if the power difference between the measured reference signal with and without equalization at the UE is below a threshold), the UE may communicate with the network entity via the RIS without performing equalization at the UE. If the wireless link between the UE and the RIS is not sufficiently flat, the UE may either perform an equalization procedure that is simpler than a scenario where the RIS does not compensate for multipath fading in the wireless link between the network entity and the RIS or the UE may communicate with the network entity without using the RIS (e.g., the UE and the network entity may communicate directly).

In some cases, the RIS may perform equalization (rather than the UE) based on the UE entering an energy saving mode. For example, the UE may enter an energy saving mode based on a remaining battery life of the UE or based on a serving cell carrier frequency band. The UE may transmit a message to the network entity indicating that the UE is entering the energy saving mode. In response, the network entity may configure a RIS to perform equalization of a wireless link between the network entity and the RIS and transmit a reference signal to the UE via the MS. The UE may measure the reference signal with and without equalization at the UE to determine the fading characteristic of the wireless link between the UE and the RIS. If the wireless link between the UE and the RIS is sufficiently flat (e.g., if a metric based on the power difference between the measured reference signal with and without equalization at the UE across a set of frequencies) is below a threshold, the UE may communicate with the network entity via the RIS without performing equalization at the UE or via performing a simpler equalization procedure. Accordingly, the UE may save energy while operating in the energy saving mode by omitting an equalization procedure completely, or by performing a simplified equalization procedure for communications with a network entity.

Aspects of the disclosure are initially described in the context of wireless communications systems. Aspects of the disclosure are further illustrated by and described with reference to process flows. Aspects of the disclosure are further illustrated by and described with reference to apparatus diagrams, system diagrams, and flowcharts that relate to spatial equalization via RIS selection.

FIG. 1 illustrates an example of a wireless communications system 100 that supports spatial equalization via RIS selection in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 over an interface (e.g., a backhaul link). IAB donor and IAB nodes 104 may communicate over an F1 interface according to a protocol that defines signaling messages (e.g., an F1 AP protocol). Additionally, or alternatively, the CU 160 may communicate with the core network over an interface, which may be an example of a portion of backhaul link, and may communicate with other CUs 160 (e.g., a CU 160 associated with an alternative IAB donor) over an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, and referred to as a child IAB node associated with an IAB donor. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support spatial equalization via RIS selection as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

The UEs 115 and the network entities 105 may support retransmissions of data to increase the likelihood that data is received successfully. Hybrid automatic repeat request (HARQ) feedback is one technique for increasing the likelihood that data is received correctly over a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In some other examples, the device may provide HARQ feedback in a subsequent slot, or according to some other time interval.

A transmitting device, such as a network entity 105, may select a RIS that is within a sufficient proximity to a receiving device, such as a UE, that the possibility of the wireless link between the RIS and the receiver being multipath fading is likely to be below a threshold (e.g., the specified wireless ling (e.g., channel) is likely to be flat fading). The network entity 105 may configure the selected RIS with a phase matrix to perform over-the-air equalization to compensate for multipath fading over the network entity 105 to RIS wireless link. Because the RIS compensates for multipath fading, the UE 115 may omit an equalization procedure or may perform a simpler equalization procedure as compared to a scenario where the RIS does not compensate for multipath fading in the wireless link between the network entity 105 and the RIS. To confirm that the wireless link between the RIS and the UE 115 is flat fading, the network entity 105 may transmit a reference signal (e.g., a known preamble sequence) to the UE 115 via the RIS. The UE 115 may measure the reference signal separately with equalization and without equalization at the UE 115 to determine the fading characteristic (e.g., the flatness) of the wireless link between the UE 115 and the RIS. The UE 115 may report the fading characteristic of the wireless link between the UE 115 and the RIS to the network entity 105. If the wireless link between the UE 115 and the RIS is sufficiently flat (e.g., if the power difference between the measured reference signal with and without equalization at the UE 115 is below a threshold), the UE 115 may communicate with the network entity 105 via the RIS without performing equalization at the UE. If the wireless link between the UE 115 and the RIS is not sufficiently flat, the UE 115 may either perform an equalization procedure that is simpler than a scenario where the RIS does not compensate for multipath fading in the wireless link between the network entity 105 and the RIS or the UE 115 may communicate with the network entity 105 without using the RIS (e.g., the UE 115 and the network entity 105 may communicate directly).

In some cases, the RIS may perform equalization (rather than the UE) based on the UE 115 entering an energy saving mode. For example, the UE 115 may enter an energy saving mode based on a remaining battery life of the UE 115 or based on a serving cell carrier frequency band. The UE 115 may transmit a message to the network entity 105 indicating that the UE 115 is entering the energy saving mode. In response, the network entity 105 may configure a RIS to perform equalization of a wireless link between the network entity 105 and the RIS and transmit a reference signal to the UE 115 via the RIS. The UE 115 may measure the reference signal with and without equalization at the UE 115 to determine the fading characteristic of the wireless link between the UE 115 and the RIS. If the wireless link between the UE 115 and the RIS is sufficiently flat (e.g., if the power difference between the measured reference signal with and without equalization at the UE) is below a threshold, the UE 115 may communicate with the network entity 105 via the RIS without performing equalization at the UE 115 or via performing a simpler equalization procedure. Accordingly, the UE 115 may save energy while operating in the energy saving mode by omitting an equalization procedure completely, or by performing a simplified equalization procedure for communications with a network entity 105.

Figure 2:
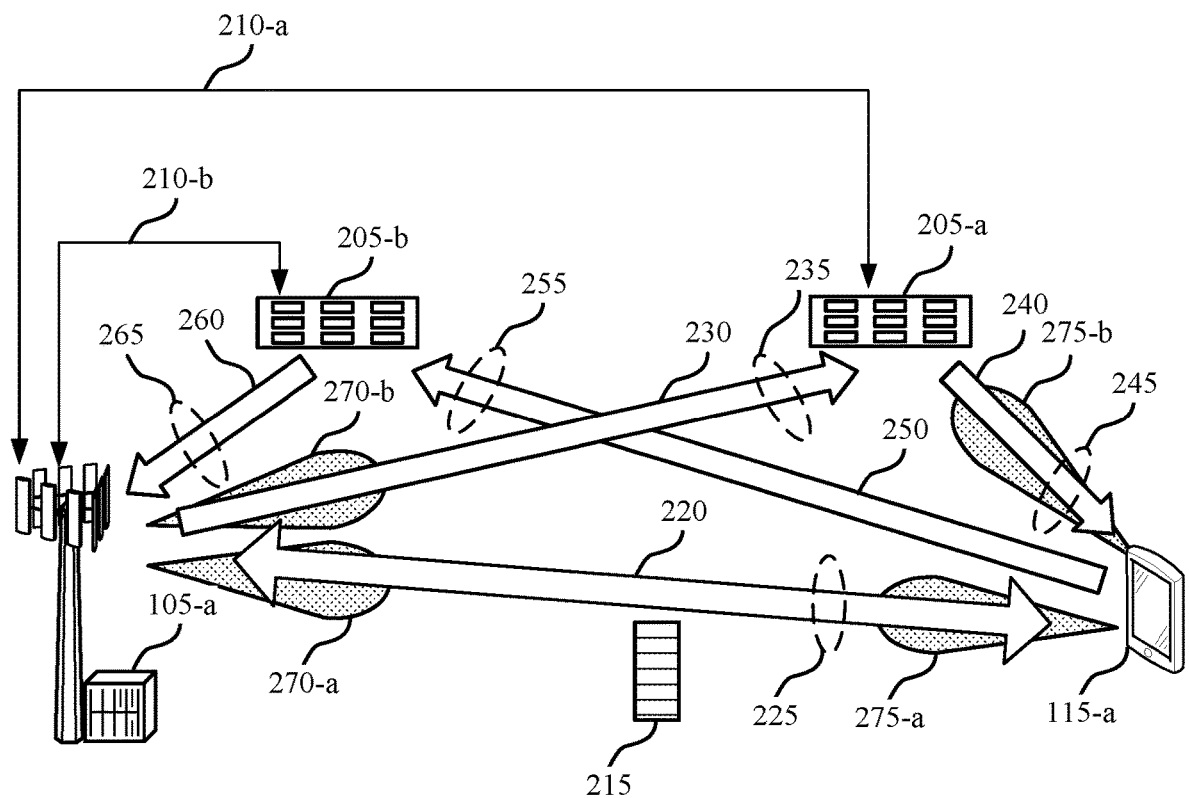
FIG. 2 illustrates an example of a wireless communications system that supports spatial equalization via MS selection in accordance with one or more aspects of the present disclosure.

FIG. 2 illustrates an example of a wireless communications system 200 that supports spatial equalization via RIS selection in accordance with one or more aspects of the present disclosure. In some examples, the wireless communications system 200 may implement aspects of wireless communications system 100. The wireless communications system 200 may include a UE 115-*a*, which may be an example of a UE 115 as described herein. The wireless communications system 200 may include a network entity 105-*a*, which may be an example of a network entity 105 as described herein.

In some examples, the network entity 105-*a* may communicate with the MS 205-*a* via a communications link 210-*a* and the network entity 105-*a* may communicate with the MS 205-*b* via a communications link 210-*b*. In some examples, the communications link 210-*a* and/or the communications link 210-*b* may be unidirectional where the network entity 105-*a* may communicate with the RIS 205-*a* or the RIS 205-*b*, or the communications link 210-*a* and/or the communications link 210-*b* may be bi-directional where the RIS 205-*a* or the RIS 205-*b* may also communicate with the network entity 105-*a*. Accordingly, the network entity 105-*a* may adjust a set of phase weights, position, orientation, other factor, or any combination thereof of the RIS 205-*a* or the RIS 205-*b*. In some implementations, the RIS 205-*a* or the RIS 205-*b* may be an example of a near-passive device that exhibits a relatively low power consumption. A RIS 205-*a* or the RIS 205-*b* may reflect an impinging wave to a desired direction. The reflection direction may be controlled by the network entity 105-*a*.

The wireless communications system 200 may include an object 215 that blocks or otherwise inhibits a wireless link 220 between the network entity 105-*a* and the UE 115-*a*. As such, the network entity 105-*a* may transmit and/or receive communications with the UE 115-*a* via the RIS 205-*a* or the RIS 205-*b*. For example, for downlink transmissions, the network entity 105-*a* may transmit to the UE 115-*a* via the RIS 205-*a* via a network entity to RIS wireless link 230 and a RIS to UE wireless link 240. For uplink transmissions, the UE 115-*a* may transmit to the network entity 105-*a* via the RIS 205-*b* via a UE to RIS wireless link 250 and a RIS to network entity wireless link 260. The network entity 105-*a* may configure the reflection directions of the RIS 205-*a* and the RIS 205-*b* for communications between the network entity 105-*a* and the UE 115-*a*. The network entity to RIS wireless link 230 may be associated with a fading characteristic 235, RIS to UE wireless link 240 may be associated with a fading characteristic 245, UE to RIS wireless link 250 may be associated with a fading characteristic 255, and the RIS to network entity wireless link 260 may be associated with a fading characteristic 265.

A pathloss associated with multipaths reflected off a RIS 205-*a* (e.g., in downlink) is a function of the distance between the transmitter (e.g., the network entity 105-*a* in downlink) and the RIS 205-*a* and the distance between the RIS 205-*a* and the receiver (e.g., the UE 115-*a* in downlink). The pathloss scales with the square of the multiplication of the distances between the transmitter and the RIS and the RIS and the receiver in the far field. Accordingly, received power $\propto 1/(d_{t2R} \, d_{R2r})^2$, where $d_{t2R}$ refers to the distance between the transmitter and the RIS and $d_{R2r}$ refers to the distance between the RIS and the receiver. Accordingly, to maximize received power, an optimal location for a RIS would be either physically close to the receiver or to the transmitter.

In some examples, a spatial equalization technique may be performed in an over-the-air manner at a RIS 205 utilizing an uplink and downlink specific RIS selection strategy. The network entity 105-*a* may determine a RIS 205 from a set of candidate RISs separately for downlink and uplink communications. For downlink, the selected RIS 205-*a* may be one that is sufficiently physically close to the UE 115-*a* (the receiver in downlink). For uplink, the selected RIS 205-*b* may be one that is sufficiently physically close to the network entity 105-*a* (the receiver in uplink). In some cases, in addition to a physical proximity to the receiver, the network entity 105-*a* may select a RIS 205 based on additional circumstances. For example, to improve positioning accuracy, a receiver (e.g., a UE 115-*a* in downlink or a network entity 105-*a* in uplink) may prefer to be associated with a RIS 205 from a set of sufficiently physically close candidate RISs that provides more angle diversity and good geometric relation between the receiver and the measuring points (e.g., a geometric dilution of precision (GDOP) concept). In some cases, to avoid interference (e.g., intercellular interference), a receiver (e.g., a UE 115-*a* in downlink or a network entity 105-*a* in uplink) may prefer a RIS 205 that is physically close and also located in an angular position such that any undesired interference may naturally be eliminated.

After selection of a RIS 205 that is physically close to the receiver (e.g., the UE 115-*a* in downlink or the network entity 105-*a* in uplink), the fading characteristic for the transmitter to RIS wireless link (e.g., the wireless link 230 for downlink communications or the wireless link 250 for uplink communications) is likely to be frequency selective due to outside scatterers occurring naturally with relatively long distance (compared to the RIS to receiver wireless link). In other words, the fading characteristic 235 and the fading characteristic 255 are likely to be frequency selective due to multipath fading. The RIS to receiver wireless link (e.g., the wireless link 240 for downlink communications or the wireless link 260 for uplink communications) is likely to be flat fading (e.g., a relatively flat channel) due to the short distance between the MS and the receiver. In other words, the fading characteristic 245 and the fading characteristic 265 are likely to be flat. Accordingly, transmissions over the transmitter to MS wireless link (e.g., the wireless link 230 for downlink communications or the wireless link 250 for uplink communications) may entail more complex equalization to deal with inter-symbol interference (ISI), while the RIS to receiver wireless link (e.g., the wireless link 240 for downlink communications or the wireless link 260 for uplink communications) may not involve equalization or may involve a relatively simple equalization. Accordingly, if the transmitter to RIS wireless link (e.g., the wireless link 230 for downlink communications or the wireless link 250 for uplink communications) is equalized at the RIS 205, then the receiver (e.g., the UE 115-a in downlink or the network entity 105-a in uplink) may not perform any equalization or may perform a relatively simple equalization due to the flatness of the RIS to receiver wireless link.

The network entity 105-a may configure a selected RIS 205 (e.g., RIS 205-a for downlink and RIS 205-b for uplink) with phase values (e.g., a phase matrix) to perform over-the-air equalization to compensate for multipath fading over the transmitter to RIS wireless link (e.g., the wireless link 230 for downlink communications or the wireless link 250 for uplink communications). The network entity 105-a may design the phase matrix using channel state information (CSI), which may be acquired prior to generation of the phase matrix but within a channel coherence time, such that the phase difference between multipaths is minimized. The phase configurations may be indicated to the RIS 205-a via the communications link 210-a and/or to the RIS 205-b via the communications link 210-b (e.g., via in-band or out-of-band control signaling).

For example, the wireless link from the transmitter to the receiver (e.g., the wireless link 240 and the wireless link 230 for downlink communications or the wireless link 260 and the wireless link 250 for uplink communications) over the n-th element of the RIS 205 may be given as $h_n(t) = \sqrt{\beta_n} \Gamma_n g_n(t)$, where $\beta_n$ is the pathloss of the wireless link from the transmitter to the receiver, $\Gamma_n$ is the complex reflection coefficient, and $g_n(t)$ describes the small-scale fading as well as the frequency selectivity between the transmitter and MS 205. If $\Gamma_n$ has unit norm (e.g., $\Gamma_n = e^{j\theta_n}$), then the network entity may design phases of all N scattering MS elements (e.g., a phase matrix) to be able equalize the received signal (or, equivalently, suppress the ISI. If s(t) is the transmitted signal, and y(t) is the received signal given as (with w(t) being observation noise), then $y(t) = \sum_{n=1}^{N} h_n(t) * s(t) + w(t)$. The network entity 105-a may design the phase matrix with the entries $\{\theta_1, \ldots, \theta_N\}$ such that the ISI in y(t) is minimized.

In some cases, the network entity 105-a may perform a procedure to confirm that the RIS to receiver wireless link (e.g., the wireless link 240 for downlink communications or the wireless link 260 for uplink communications) is sufficiently flat. For example, for downlink communications, the network entity 105-a may transmit, to the UE 115-a via the RIS 205-a, a reference signal including a known preamble in a periodic or on-demand manner. The RIS 205-a may use a preconfigured phase matrix (received from the network entity 105-a) to perform equalization. The UE 115-a may measure the received reference signal with and without performing equalization at the UE 115-a. The UE 115-a may report a power difference between the received reference signal with and without performing equalization at the UE 115-a to the network entity 105-a. If the power difference due to the use of equalization at the UE 115-a is less than a threshold, the fading characteristic 245 of the wireless link 240 may be sufficiently flat to omit equalization at the UE 115-a. If the power difference due to the use of equalization at the UE 115-a is greater than a threshold, then the UE 115-a may either perform equalization (which equalization may be simpler than the case where the RIS 205-a does not perform equalization) or the network entity 105-a may avoid use of the RIS 205-a for downlink transmissions to the UE 115-a until a future measurement occasion. For example, if the power difference due to the use of equalization at the UE 115-a is greater than a second threshold (where the second threshold is greater than the first threshold), then the network entity 105-a may avoid use of the RIS 205-a for downlink transmissions to the UE 115-a until a future measurement occasion. If the power difference due to the use of equalization at the UE 115-a is less than the second threshold, the UE 115-a may perform equalization (which equalization may be simpler than the case where the RIS 205-a does not perform equalization).

As another example, for uplink communications, the network entity 105-a may indicate a set of resources to transmit a reference signal including a known preamble. The UE 115-a may transmit, to the network entity 105-a via the RIS 205-b, a reference signal including the known preamble using the indicated resources. The MS 205-b may use a preconfigured phase matrix (received from the network entity 105-a) to perform equalization. The network entity 105-a may measure the received reference signal with and without performing equalization at the network entity 105-a. If the power difference due to the use of equalization at the network entity 105-a is less than a threshold, the fading characteristic 265 of the wireless link 260 may be sufficiently flat to omit equalization at the network entity 105-a. If the power difference due to the use of equalization at the network entity 105-a is greater than a threshold, then the network entity 105-a may either perform equalization (which equalization may be simpler than the case where the RIS 205-b does not perform equalization) or the network entity 105-a may avoid use of the RIS 205-b for uplink transmissions from the UE 115-a until a future measurement occasion. For example, if the power difference due to the use of equalization at the network entity 105-a is greater than a second threshold (where the second threshold is greater than the first threshold), then the network entity 105-a may avoid use of the RIS 205-b for uplink transmissions from the UE 115-a until a future measurement occasion. If the power difference due to the use of equalization at the network entity 105-a is less than the second threshold, the network entity 105-a may perform equalization (which equalization may be simpler than the case where the RIS 205-b does not perform equalization).

In some cases, the UE 115-a may offload communications tasks, such as equalization, to the RIS 205-a to save energy through exploiting over-the-air processing. The network entity 105-a may serve the UE 115-a using a first antenna port associated with a transmit beam 270-a for the wireless link 220, and the UE 115-a may receive transmissions from the network entity over the wireless link 220 via a receive beam 275-a. The transmit beam 270-a and the receive beam 275-a may consider the line-of-sight (LoS) and naturally scattering multipaths and may not consider the artificial multipaths reflected off of a RIS 205-a. If the UE 115-a intends to enter an energy saving state or mode, the UE 115-a may transmit an indication to the network entity 105-a that the UE 115-a will enter the saving mode. For example, the UE 115-a may be triggered to enter an energy saving mode based on a remaining battery life of the UE 115-a, and the UE 115-a may accordingly apply energy saving based reception to use the remaining battery efficiently. As another example, if the UE 115-a will be served at a high carrier frequency band (e.g., in THz), the UE 115-a may prefer an energy saving based reception to run a simple receiver implementation similar to a single-tap receiver. Based on the indication that the UE 115-*a* will enter the saving mode, the network entity 105-*a* may select a RIS 205-*a* from a set of candidate RISs that is sufficiently physical close to the UE 115-*a* to serve the UE 115-*a* while the UE 115-*a* operates in the energy saving mode. The network entity 105-*a* may configure the RIS 205-*a* and the UE 115-*a* to use the RIS 205-*a* while the UE 115-*a* operates in the energy saving mode.

As described herein, in addition to a physical proximity to the UE 115-*a*, the network entity 105-*a* may select a RIS 205-*a* based on additional circumstances. For example, to improve positioning accuracy, the UE 115-*a* may prefer to be associated with a RIS 205-*a* from a set of sufficiently physically close candidate RISs 205 that provides more angle diversity and good geometric relation between the UE 115-*a* and the measuring points (e.g., a GDOP). In some cases, to avoid interference (e.g., inter-cellular interference), the UE 115-*a* may prefer a RIS 205-*a* that is physically close and also located in an angular position such that any undesired interference may naturally be eliminated.

The network entity 105-*a* may serve the UE 115-*a* in the energy saving mode using a different antenna port (e.g., via a transmit beam 270-*b*), and the UE 115-*a* may use a different receive beam 275-*b*. The active beams (transmit beam 270-*b* and receive beam 275-*b*) in the energy saving mode may consider either case A or case B. For case A, the artificial multipaths reflected off the selected RIS 205-*a* are considered. For case B, the artificial multipaths reflected off the selected RIS 205-*a*, the LoS, and naturally-scattering multipaths are considered. For both cases, the RIS 205-*a* may be used, and both cases involve different phase matrices (e.g., the phase values for the reflecting elements of the RIS 205-*a*) due to the different paths considered. In some cases, the wireless link 240 may involve equalization of a reduced capability, for example, where a sufficiently close RIS cannot be found. In case A, if the wireless link 230 is equalized at the RIS 205-*a*, then the UE 115-*a* does not perform or performs a simple equalization since the UE 115-*a* is served by the wireless link 240, which does not demand equalization (if the fading characteristic 245 of the wireless link 240 is sufficiently flat). For case B, the UE 115-*a* performs an equalization that is simpler than the scenario the MS 205-*a* is not used since the RIS 205-*a* will compensate for the artificial multipaths over the wireless link 230 and for natural multipaths in the wireless link 220 (e.g., the fading characteristics 225 of the network entity 105-*a* to UE 115-*a* wireless link 220).

From the perspective of the UE 115-*a*, keeping the wireless link 220 (e.g., the LoS and multipaths) as in case B may be beneficial because the respective pathloss may be smaller than the RIS reflected multipaths (e.g., in case A). From an equalization and energy saving perspective, keeping only the RIS reflected multipaths (e.g., as in case A), may be better to avoid any equalization at the UE 115-*a* (and therefore to save power at the UE 115-*a*) compared to case A which may involve equalization at the UE 115-*a*. Accordingly, the network entity 105-*a* may select an antenna port (and respective transmit beam 270-*b*) to compromise between received signal quality and task-offloading based energy saving (e.g., offloading the equalization task from the UE 115-*a* to the RIS 205-*a*). In some cases, the network entity 105-*a* may consider whether the UE 115-*a* should have more LoS signal to improve positioning accuracy.

The network entity 105-*a* may design a phase matrix for the RIS 205-*a* considering the CSI associated with the selected antenna port to minimize (or avoid completely) the implementation of the selected communication task at the UE 115-*a* (e.g., equalization, Doppler compensation, or any other processing that may be managed by adjusting the phases of the incoming multipaths). For example, for equalization, the phase matrix may be designed to minimize phase difference between different multipaths.

The network entity 105-*a* may use reported fading characteristics 245 of the wireless link 240 when selecting the antenna port to serve the UE 115-*a* during the energy saving mode and when designing the phase matrix for the RIS 205-*a*. For example, as described herein, the network entity 105-*a* may transmit a reference signal to the UE 115-*a* including a known preamble using the transmit beam 270-*b*. The network entity 105-*a* may transmit the reference signal periodically or on-demand. In some cases, the network entity 105-*a* may transmit the reference signal in response to receiving an indication that the UE 115-*a* is entering an energy saving mode. The RIS 205-*a* may use a preconfigured phase matrix (received from the network entity 105-*a*) to compensate for multipath fading in the wireless link 230. The UE 115-*a* may measure the reference signal received via the RIS 205-*a*, using a suitable antenna port (e.g., via the receive beam 275-*b*) in the case that the UE 115-*a* is configured with multiple antenna ports. The UE 115-*a* may process the reference signal with and without equalization at the UE 115-*a*. The UE 115-*a* may compute the output signal quality (e.g., a bit error rate (BER) or a received power difference) for the reference signal with and without equalization at the UE 115-*a*.

The UE 115-*a* may report the fading characteristic 245 of the wireless link 240 to the network entity 105-*a*. The network entity 105-*a* may use the reported fading characteristic when selecting the antenna port, determining whether to use the RIS 205-*a*, determining a phase matrix for the RIS 205-*a*, and/or determining an equalization procedure for the UE 115-*a*. If the power difference or the BER difference due to the use of equalization at the UE 115-*a* is less than a threshold, the fading characteristic 245 of the wireless link 240 may be sufficiently flat to omit equalization at the UE 115-*a* (or reduce equalization, for example by the UE 115-*a* performing a simplified equalization procedure). If the power difference or the BER difference due to the use of equalization at the UE 115-*a* is greater than a threshold, then the UE 115-*a* may either perform equalization (which equalization may be simpler than the case where the RIS 205-*a* does not perform equalization) or the network entity 105-*a* may avoid use of the RIS 205-*a* for downlink transmissions to the UE 115-*a* until a future measurement occasion. For example, if the power difference or the BER difference due to the use of equalization at the UE 115-*a* is greater than a second threshold (where the second threshold is greater than the first threshold), then the network entity 105-*a* may avoid use of the RIS 205-*a* for downlink transmissions to the UE 115-*a* until a future measurement occasion. If the power difference or the BER difference due to the use of equalization at the UE 115-*a* is less than the second threshold, the UE 115-*a* may perform equalization (which equalization may be simpler than the case where the RIS 205-*a* does not perform equalization).

If the network entity 105-*a* serves multiple UEs 115, a single RIS 205 may be used to offload communications tasks of multiple UEs 115, especially when the UEs 115 are served in a broadcast manner or when the RIS 205 is capable of producing multiple beams (each used with serving a different UE 115).

Figure 3:
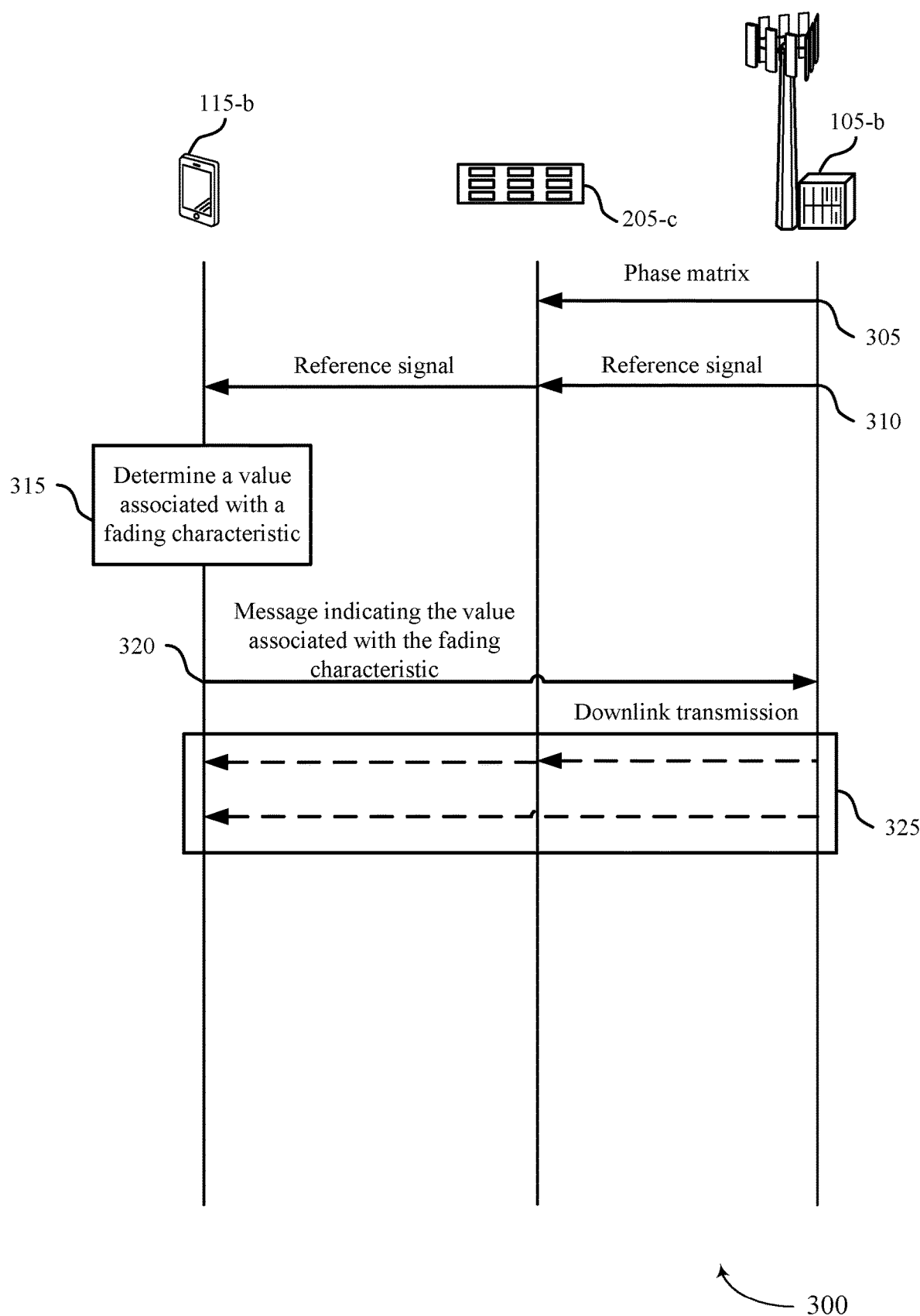
FIG. 3 illustrates an example of a process flow that supports spatial equalization via RIS selection in accordance with one or more aspects of the present disclosure.

FIG. 3 illustrates an example of a process flow 300 that supports spatial equalization via RIS selection in accordance with one or more aspects of the present disclosure. The process flow 300 may include a UE 115-*b*, which may be an example of a UE 115 as described herein. The process flow 300 may include a network entity 105-*b*, which may be an example of a network entity 105 as described herein. The process flow 300 may include a RIS 205-*c*, which may be an example of a RIS 205 as described herein. In the following description of the process flow 300, the operations between the network entity 105-*b*, the RIS 205-*c*, and the UE 115-*b* may be transmitted in a different order than the example order shown, or the operations performed by the network entity 105-*b*, the RIS 205-*c*, and the UE 115-*b* may be performed in different orders or at different times. Some operations may also be omitted from the process flow 300, and other operations may be added to the process flow 300.

At 305, the network entity 105-*b* may transmit an indication of a phase matrix to apply to transmissions reflected from the RIS 205-*c* to the UE 115-*b*. For example, the phase matrix may be designed based on CSI reported for the wireless link between the network entity 105-*b* and the RIS 205-*c*. For example, the phase matrix may be designed for an equalization procedure to resolve multipath fading for the wireless link between the network entity 105-*b* and the RIS 205-*c*. In some cases, the network entity 105-*b* may select the RIS 205-*c* based on a location of the UE 115-*b* and the RIS 205-*c* (e.g., based on a physical proximity of the UE 115-*b* and the RIS 205-*c*). For example, the UE 115-*b* may report the location of the UE 115-*b* to the network entity 105-*b*, and the network entity 105-*b* may be aware of the location of a physically fixed set of RISs including the RIS 205-*c*. In some cases, the network entity 105-*b* may select the RIS 205-*c* based on an angle diversity associated with the RIS 205-*c* and the UE 115-*b*, an angular position associated with the RIS 205-*c* and the UE 115-*b*, or a geometric relation associated with the RIS 205-*c* and the UE 115-*b*.

At 310, the UE 115-*b* may receive a reference signal from the network entity 105-*b* via a wireless link between the RIS 205-*c* and the UE 115-*b*. The RIS 205-*c* may apply the phase matrix to the reference signal. In some cases, the reference signal may be a preamble sequence (e.g., a known preamble sequence). In some cases, the network entity 105-*b* may select an antenna port for transmitting the reference signal based on the selected RIS 205-*c*.

At 315, the UE 115-*b* may determine a value associated with a fading characteristic of the wireless link between the MS 205-*c* and the UE 115-*b* based on the reference signal. In some cases, determining the value associated with the fading characteristic includes identifying a power difference between a first received power measurement of the reference signal without equalization at the UE 115-*b* and a second received power measurement of the reference signal with equalization at the UE 115-*b*.

At 320, the UE 115-*b* may transmit, to the network entity 105-*b*, a message indicating the value associated with the fading characteristic for the wireless link between the RIS 205-*c* and the UE 115-*b*.

At 325, the network entity 105-*b* may transmit downlink transmissions to the UE 115-*b* based on the value associated with the fading characteristic for the wireless link between the RIS 205-*c* and the UE 115-*b*. In some cases, the network entity 105-*b* may transmit downlink transmissions to the UE 115-*b* via the RIS 205-*c* based on the value associated with the fading characteristic for the wireless link between the RIS 205-*c* and the UE 115-*b*, and the RIS 205-*c* may apply the phase matrix to the downlink transmissions. In some cases, the network entity 105-*b* may transmit downlink transmissions directly to the UE 115-*b* based on the value associated with the fading characteristic for the wireless link between the RIS 205-*c* and the UE 115-*b*.

In some cases, the UE 115-*b* may apply a first equalization process at the UE 115-*b* to communicate directly with the network entity 105-*b* and apply a second equalization process at the UE 115-*b* to communicate with the network entity 105-*b* via the RIS 205-*c*, the second equalization process different from the first equalization process and based on the fading characteristic. In some cases, the second equalization process may be an absence of an equalization process at the UE 115-*b*. In some cases, the second equalization process may be associated with a simplified equalization process relative to the first equalization process. In some cases, the network entity 105-*b* may transmit downlink transmissions via the RIS 205-*c* with the UE 115-*b* based on the value associated with the fading characteristic being greater than a threshold. In some cases, the network entity 105-*b* may transmit downlink transmissions directly with the UE 115-*b* based on the value associated with the fading characteristic being greater than a threshold.

In some cases, prior to receiving the reference signal at 310, the UE 115-*b* may receive, from the network entity 105-*b*, control signaling indicating a set of resources for receiving the reference signal. In some cases, the UE 115-*b* may receive, in response to indicating the value associated with the fading characteristic at 320, control signaling indicating the RIS 205-*c*.

Figure 4:
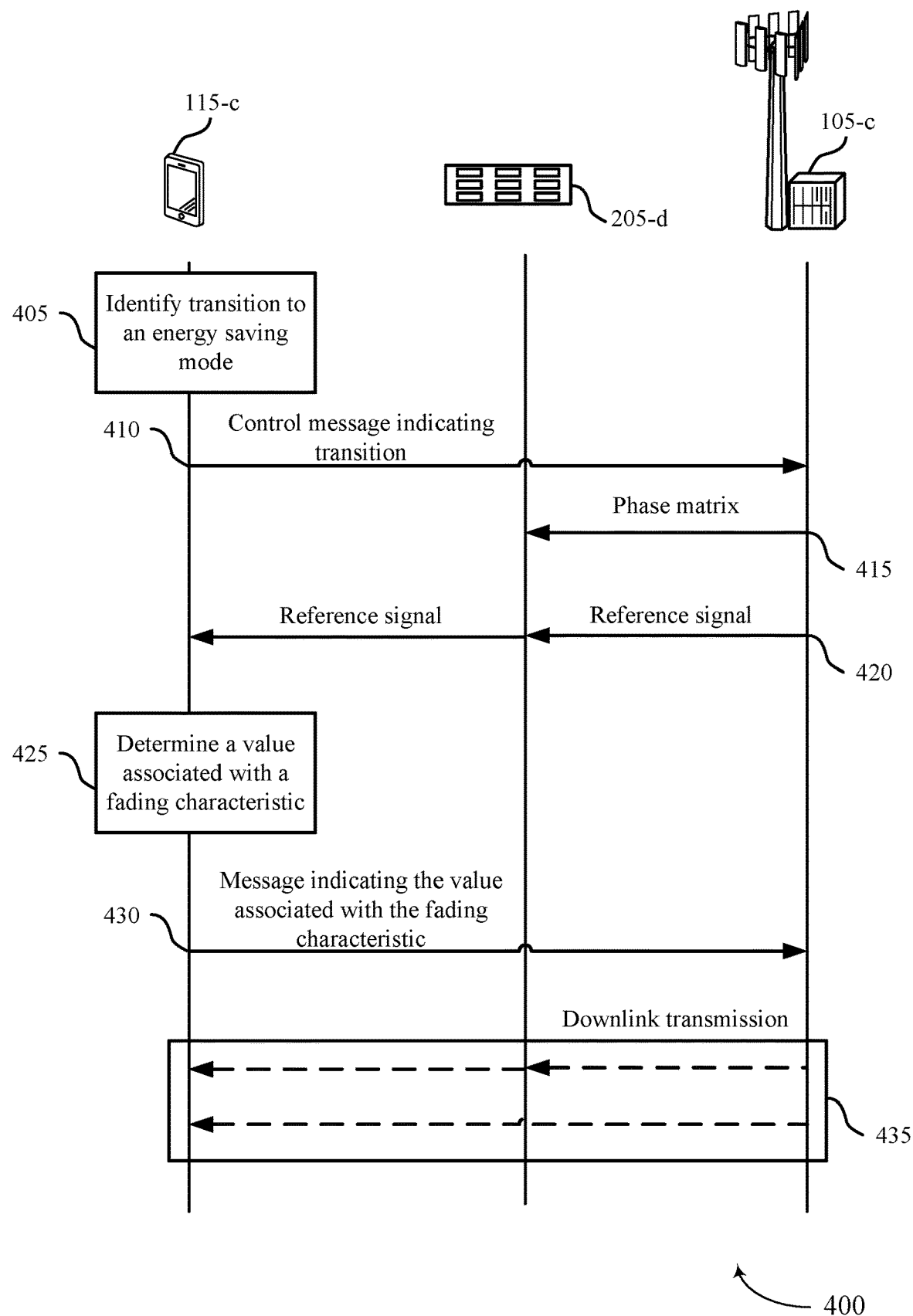
FIG. 4 illustrates an example of a process flow that supports spatial equalization via RIS selection in accordance with one or more aspects of the present disclosure.

FIG. 4 illustrates an example of a process flow 400 that supports spatial equalization via RIS selection in accordance with one or more aspects of the present disclosure. The process flow 400 may include a UE 115-*c*, which may be an example of a UE 115 as described herein. The process flow 400 may include a network entity 105-*c*, which may be an example of a network entity 105 as described herein. The process flow 400 may include a RIS 205-*d*, which may be an example of a RIS 205 as described herein. In the following description of the process flow 400, the operations between the network entity 105-*c*, the RIS 205-*d*, and the UE 115-*c* may be transmitted in a different order than the example order shown, or the operations performed by the network entity 105-*c*, the RIS 205-*d*, and the UE 115-*c* may be performed in different orders or at different times. Some operations may also be omitted from the process flow 400, and other operations may be added to the process flow 400.

At 405, the UE 115-*c* may identify that the UE 115-*c* is transitioning to an energy saving mode. For example, the UE 115-*c* may transition to an energy saving mode based on a remaining battery life of the UE or a change of serving carrier frequency band.

At 410, the UE 115-*c* may transmit, to the network entity 105-*c*, a control message indicating that the UE 115-*c* is transitioning to an energy saving mode.

At 415, the network entity 105-*c* may transmit an indication of a phase matrix to apply to transmissions reflected from the RIS 205-*d* to the UE 115-*c* while the UE 115-*c* is operating in the energy saving mode. For example, the phase matrix may be designed based on CSI reported for the wireless link between the network entity 105-*c* and the RIS 205-*d*. For example, the phase matrix may be designed for an equalization procedure to resolve multipath fading for the wireless link between the network entity 105-*c* and the RIS 205-*d*. In some cases, the phase matrix may be designed to offload tasks from the UE 115-*c* to the RIS 205-*d*. In some cases, the network entity 105-*c* may select the MS 205-*d* based on a location of the UE 115-*c* and the MS 205-*d* (e.g., based on a physical proximity of the UE 115-*c* and the MS 205-*d*). For example, the UE 115-*c* may report the location of the UE 115-c to the network entity 105-c, and the network entity 105-c may be aware of the location of a physically fixed set of RISs including the RIS 205-d. In some cases, the network entity 105-c may select the RIS 205-d based on an angle diversity associated with the RIS 205-d and the UE 115-c, an angular position associated with the RIS 205-d and the UE 115-c, or a geometric relation associated with the RIS 205-d and the UE 115-c.

At 420, in response to the control message at 410, the UE 115-c may receive a reference signal from the network entity 105-c via a wireless link between the RIS 205-d and the UE 115-c. The RIS 205-d may apply the phase matrix to the reference signal. In some cases, the reference signal may be a preamble sequence (e.g., a known preamble sequence). In some cases, the network entity 105-c may select an antenna port for transmitting the reference signal based on the selected RIS 205-d. In some cases, the UE 115-c may communicate with the network entity 105-c via a first transmit beam prior to transmitting the control message, and the reference signal is received via a second transmit beam.

At 425, the UE 115-c may determine a value associated with a fading characteristic of the wireless link between the RIS 205-d and the UE 115-c based on the reference signal. In some cases, determining the value associated with the fading characteristic includes identifying a power difference between a first received power measurement of the reference signal without equalization at the UE 115-c and a second received power measurement of the reference signal with equalization at the UE 115-c.

At 430, the UE 115-c may transmit, to the network entity 105-c, a message indicating the value associated with the fading characteristic for the wireless link between the RIS 205-d and the UE 115-c.

At 435, the network entity 105-c may transmit downlink transmissions to the UE 115-c based on the value associated with the fading characteristic for the wireless link between the MS 205-d and the UE 115-c. In some cases, the network entity 105-c may transmit downlink transmissions to the UE 115-c via the MS 205-d based on the value associated with the fading characteristic for the wireless link between the RIS 205-d and the UE 115-c, and the MS 205-d may apply the phase matrix to the downlink transmissions. In some cases, the network entity 105-c may transmit downlink transmissions directly to the UE 115-c based on the value associated with the fading characteristic for the wireless link between the RIS 205-d and the UE 115-c.

Figure 5:
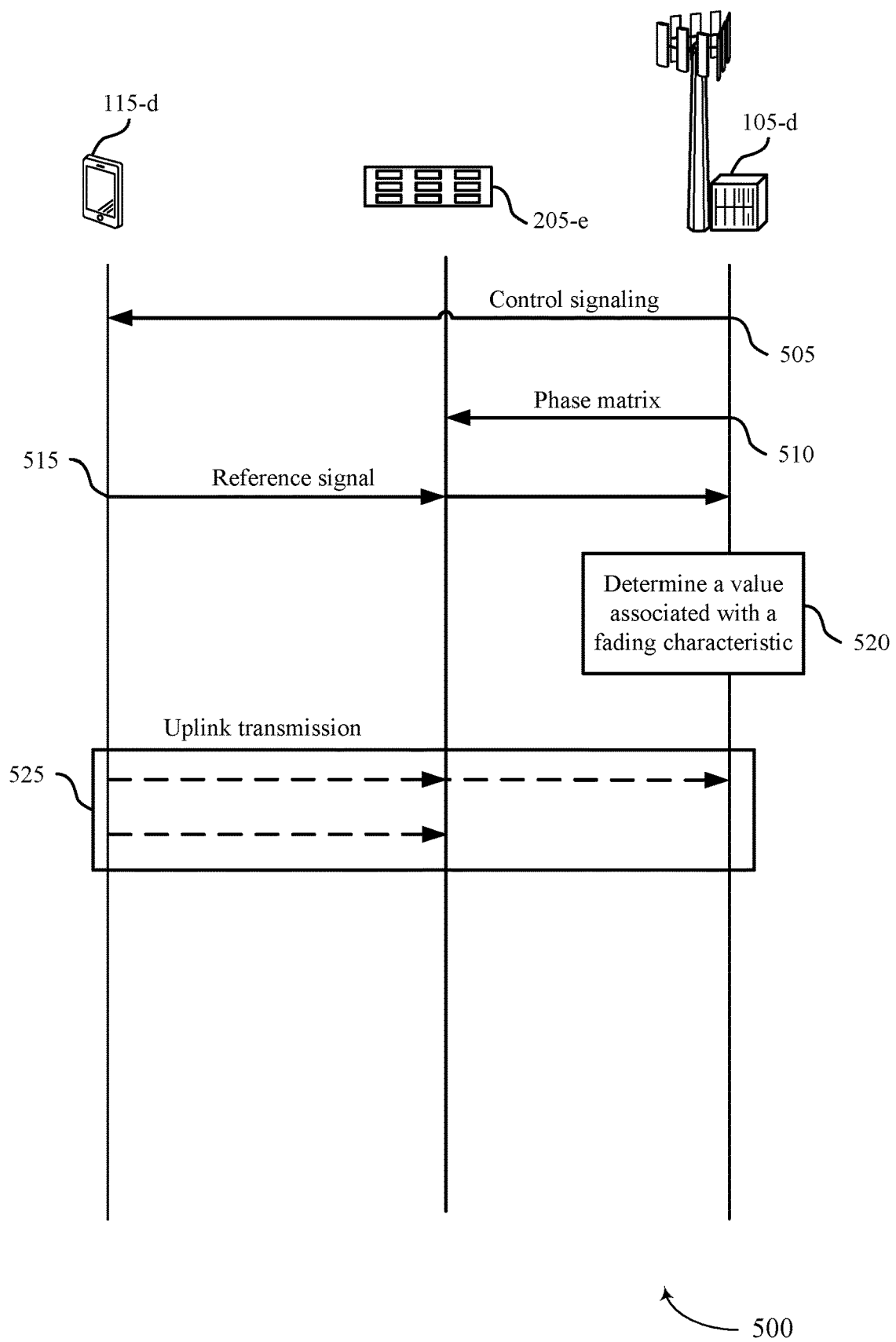
FIG. 5 illustrates an example of a process flow that supports spatial equalization via RIS selection in accordance with one or more aspects of the present disclosure.

FIG. 5 illustrates an example of a process flow 500 that supports spatial equalization via RIS selection in accordance with one or more aspects of the present disclosure. The process flow 500 may include a UE 115-d, which may be an example of a UE 115 as described herein. The process flow 500 may include a network entity 105-d, which may be an example of a network entity 105 as described herein. The process flow 500 may include a RIS 205-e, which may be an example of a RIS 205 as described herein. In the following description of the process flow 500, the operations between the network entity 105-d, the RIS 205-e, and the UE 115-d may be transmitted in a different order than the example order shown, or the operations performed by the network entity 105-d, the RIS 205-e, and the UE 115-d may be performed in different orders or at different times. Some operations may also be omitted from the process flow 500, and other operations may be added to the process flow 500.

At 505, the network entity 105-d may transmit, to the UE 115-d, control signaling indicating a set of resources for transmission by the UE 115-d of a reference signal for selection by the network entity 105-d of a RIS 205-e for uplink communications.

At 510, the network entity 105-d may transmit an indication of a phase matrix to apply to uplink transmissions reflected from the RIS 205-e to the network entity 105-d. For example, the phase matrix may be designed based on CSI reported for the wireless link between the UE 115-d and the RIS 205-e. For example, the phase matrix may be designed for an equalization procedure to resolve multipath fading for the wireless link between the UE 115-d and the RIS 205-e. In some cases, the network entity 105-d may select the RIS 205-d based on a location of the network entity 105-d and the RIS 205-e (e.g., based on a physical proximity of the network entity 105-d and the RIS 205-e). For example, the network entity 105-d may be aware of the location of a physically fixed set of RISs including the RIS 205-e. In some cases, the network entity 105-d may select the MS 205-e based on an angle diversity associated with the MS 205-d and the network entity 105-d, an angular position associated with the RIS 205-d and the network entity 105-d, or a geometric relation associated with the MS 205-d and the network entity 105-d.

At 515, the UE 115-d transmit a reference signal to the network entity 105-d via a wireless link between the RIS 205-e and the network entity 105-d using the indicated set of resources. The RIS 205-e may apply the phase matrix to the reference signal. In some cases, the reference signal may be a preamble sequence (e.g., a known preamble sequence).

At 520, the network entity 105-d may determine a value associated with a fading characteristic of the wireless link between the RIS 205-e and the network entity 105-d based on the reference signal. In some cases, determining the value associated with the fading characteristic includes identifying a power difference between a first received power measurement of the reference signal without equalization at the network entity 105-d and a second received power measurement of the reference signal with equalization at the network entity 105-d.

At 525, the network entity 105-d may receive uplink communications from the UE 115-d via the RIS 205-e based on the fading characteristic for the wireless link between the RIS 205-e and the network entity 105-d. In some cases, the network entity 105-d may receive uplink transmissions from the UE 115-d via the RIS 205-e based on the value associated with the fading characteristic for the wireless link between the RIS 205-e and the network entity 105-d, and the RIS 205-e may apply the phase matrix to the uplink transmissions. In some cases, the network entity 105-d may receive uplink transmissions directly from the UE 115-d based on the value associated with the fading characteristic for the wireless link between the RIS 205-e and the network entity 105-d.

In some cases, the network entity 105-d may apply a first equalization process at the network entity 105-d to communicate directly with the UE 115-d and apply a second equalization process at the network entity 105-d to communicate with the UE 115-d via the RIS 205-e, the second equalization process different from the first equalization process and based on the fading characteristic. In some cases, the second equalization process may be an absence of an equalization process at the network entity 105-d. In some cases, the second equalization process may be associated with a simplified equalization process relative to the first equalization process. In some cases, the network entity 105-d may receive uplink transmissions via the RIS 205-e from the UE 115-d based on the value associated with the fading characteristic being greater than a threshold. In some cases, the network entity 105-d may receive uplink transmissions directly from the UE 115-d based on the value associated with the fading characteristic being greater than a threshold.

Figure 6:
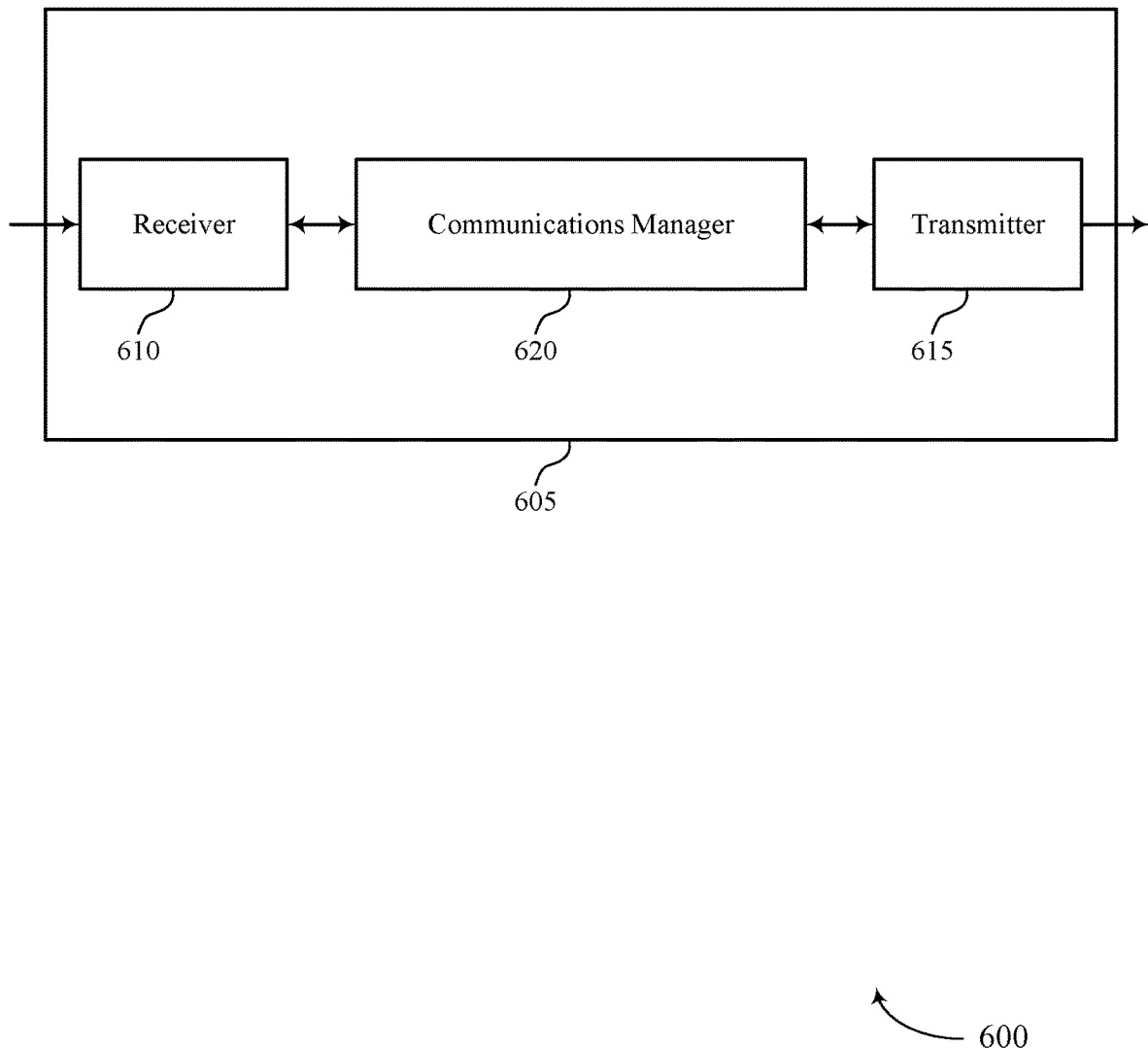
FIGS. 6 and 7 show block diagrams of devices that support spatial equalization via RIS selection in accordance with one or more aspects of the present disclosure.

FIG. 6 shows a block diagram 600 of a device 605 that supports spatial equalization via RIS selection in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to spatial equalization via RIS selection). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to spatial equalization via RIS selection). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of spatial equalization via RIS selection as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. For example, the communications manager 620 may be configured as or otherwise support a means for receiving a reference signal from a network entity via a wireless link between a RIS and the UE. The communications manager 620 may be configured as or otherwise support a means for determining, based on the reference signal, a value associated with a fading characteristic for the wireless link. The communications manager 620 may be configured as or otherwise support a means for transmitting, to the network entity, a message including an indication of the value associated with the fading characteristic for the wireless link.

By including or configuring the communications manager 620 in accordance with examples as described herein, the device 605 (e.g., a processor controlling or otherwise coupled with the receiver 610, the transmitter 615, the communications manager 620, or a combination thereof) may support techniques reduced power consumption and more efficient utilization of communication resources by allowing the UE to omit equalization or perform a simpler equalization procedure.

Figure 7:
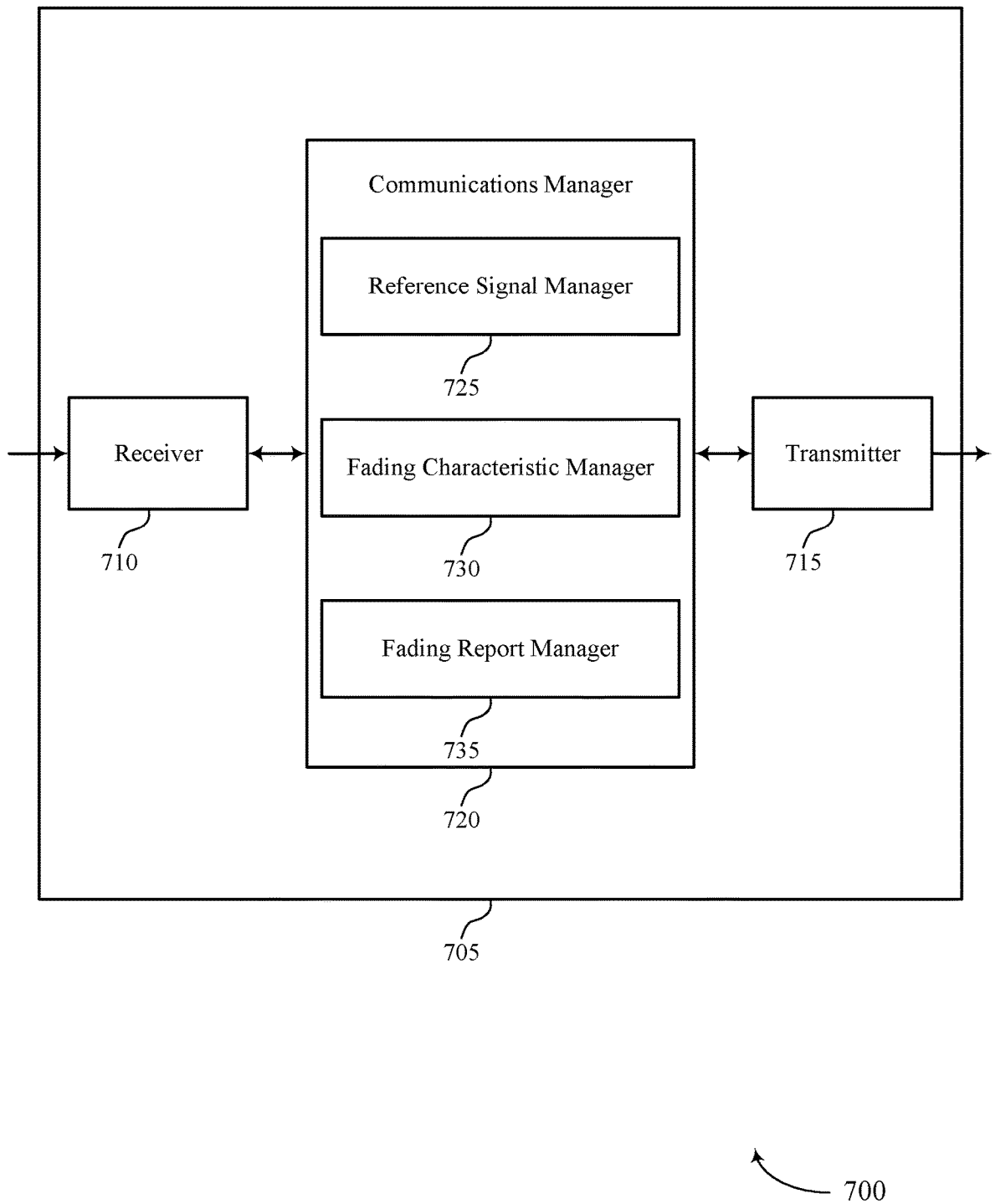

FIG. 7 shows a block diagram 700 of a device 705 that supports spatial equalization via RIS selection in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to spatial equalization via RIS selection). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to spatial equalization via RIS selection). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of spatial equalization via RIS selection as described herein. For example, the communications manager 720 may include a reference signal manager 725, a fading characteristic manager 730, a fading report manager 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a UE in accordance with examples as disclosed herein. The reference signal manager 725 may be configured as or otherwise support a means for receiving a reference signal from a network entity via a wireless link between a RIS and the UE. The fading characteristic manager 730 may be configured as or otherwise support a means for determining, based on the reference signal, a value associated with a fading characteristic for the wireless link. The fading report manager 735 may be configured as or otherwise support a means for transmitting, to the network entity, a message including an indication of the value associated with the fading characteristic for the wireless link.

Figure 8:
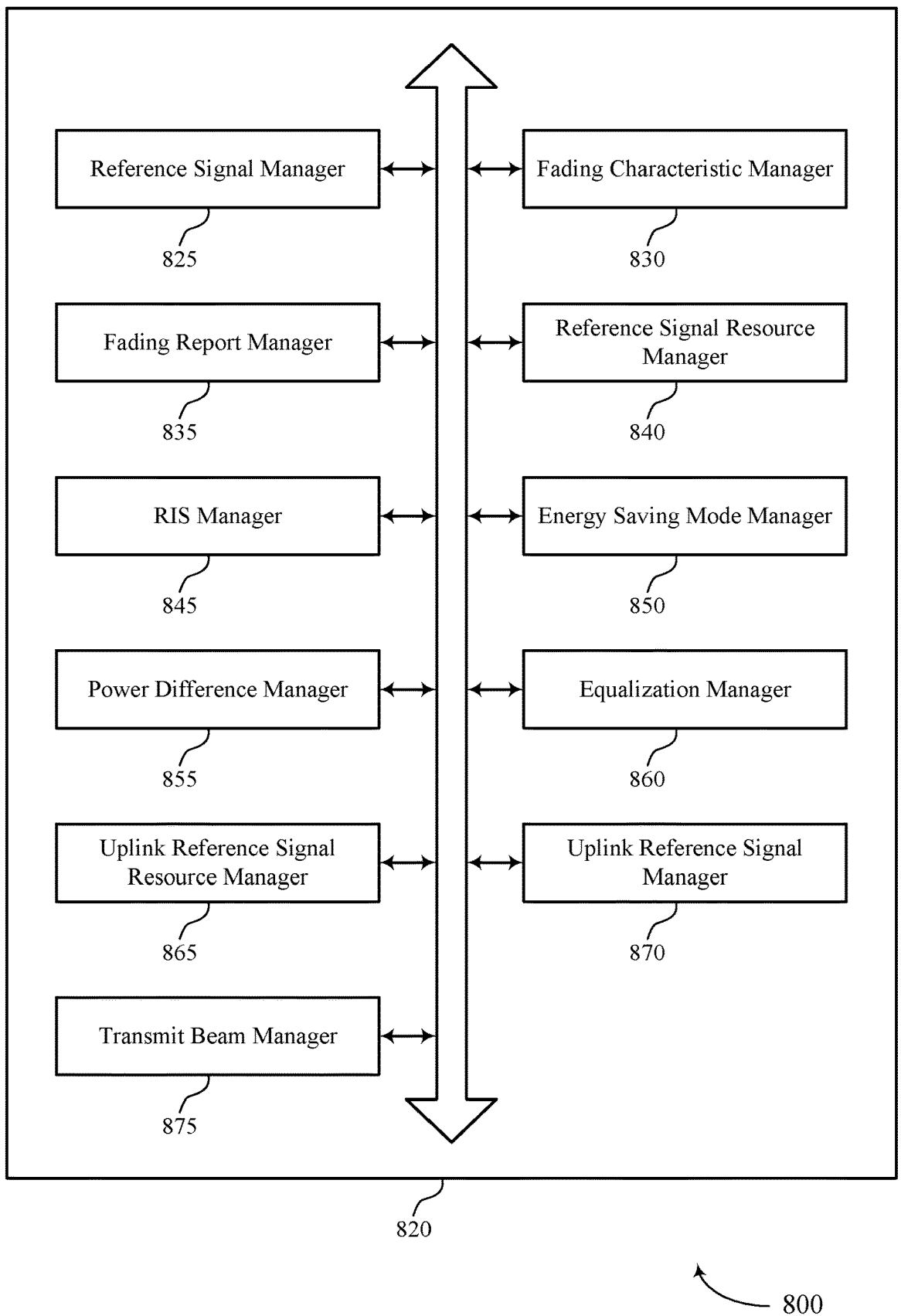
FIG. 8 shows a block diagram of a communications manager that supports spatial equalization via MS selection in accordance with one or more aspects of the present disclosure.

FIG. 8 shows a block diagram 800 of a communications manager 820 that supports spatial equalization via RIS selection in accordance with one or more aspects of the present disclosure. The communications manager 820 may be an example of aspects of a communications manager 620, a communications manager 720, or both, as described herein. The communications manager 820, or various components thereof, may be an example of means for performing various aspects of spatial equalization via RIS selection as described herein. For example, the communications manager 820 may include a reference signal manager 825, a fading characteristic manager 830, a fading report manager 835, a reference signal resource manager 840, a RIS manager 845, an energy saving mode manager 850, a power difference manager 855, an equalization manager 860, an uplink reference signal resource manager 865, an uplink reference signal manager 870, a transmit beam manager 875, or any combination thereof. Each of these components may communicate, directly or indirectly, with one another (e.g., via one or more buses).

The communications manager 820 may support wireless communications at a UE in accordance with examples as disclosed herein. The reference signal manager 825 may be configured as or otherwise support a means for receiving a reference signal from a network entity via a wireless link between a RIS and the UE. The fading characteristic manager 830 may be configured as or otherwise support a means for determining, based on the reference signal, a value associated with a fading characteristic for the wireless link. The fading report manager 835 may be configured as or otherwise support a means for transmitting, to the network entity, a message including an indication of the value associated with the fading characteristic for the wireless link.

In some examples, the reference signal resource manager 840 may be configured as or otherwise support a means for receiving, from the network entity, control signaling indicating a set of resources for receiving the reference signal.

In some examples, the RIS manager 845 may be configured as or otherwise support a means for receiving, from the network entity at least in part in response to the indication of the value associated with the fading characteristic, control signaling indicating the RIS.

In some examples, the energy saving mode manager 850 may be configured as or otherwise support a means for transmitting, to the network entity, a control message indicating that the UE is transitioning to an energy saving mode, where the reference signal is received from the network entity at least in part in response to the control message.

In some examples, the energy saving mode manager 850 may be configured as or otherwise support a means for transitioning to the energy saving mode based on one of a remaining battery life of the UE or a change of serving carrier frequency band.

In some examples, the transmit beam manager 875 may be configured as or otherwise support a means for communicating with the network entity via a first transmit beam prior to transmitting the control message, where the reference signal is received via a second transmit beam.

In some examples, to support determining the value associated with the fading characteristic, the power difference manager 855 may be configured as or otherwise support a means for identifying a power difference between a first received power measurement of the reference signal without equalization at the UE and a second received power measurement of the reference signal with equalization at the UE.

In some examples, the equalization manager 860 may be configured as or otherwise support a means for applying a first equalization process at the UE to communicate directly with the network entity. In some examples, the equalization manager 860 may be configured as or otherwise support a means for applying a second equalization process at the UE to communicate with the network entity via the RIS, the second equalization process different from the first equalization process and based on the fading characteristic.

In some examples, the second equalization process includes an absence of an equalization process at the UE to communicate with the network entity.

In some examples, the second equalization process is associated with a simplified equalization process relative to the first equalization process.

In some examples, the uplink reference signal resource manager 865 may be configured as or otherwise support a means for receiving, from the network entity, control signaling indicating a set of resources for transmission by the UE of a second reference signal for selection by the network entity of a second RIS for uplink communications. In some examples, the uplink reference signal manager 870 may be configured as or otherwise support a means for transmitting, to the network entity via the second RIS, the second reference signal on the set of resources.

In some examples, the reference signal includes a preamble sequence.

Figure 9:
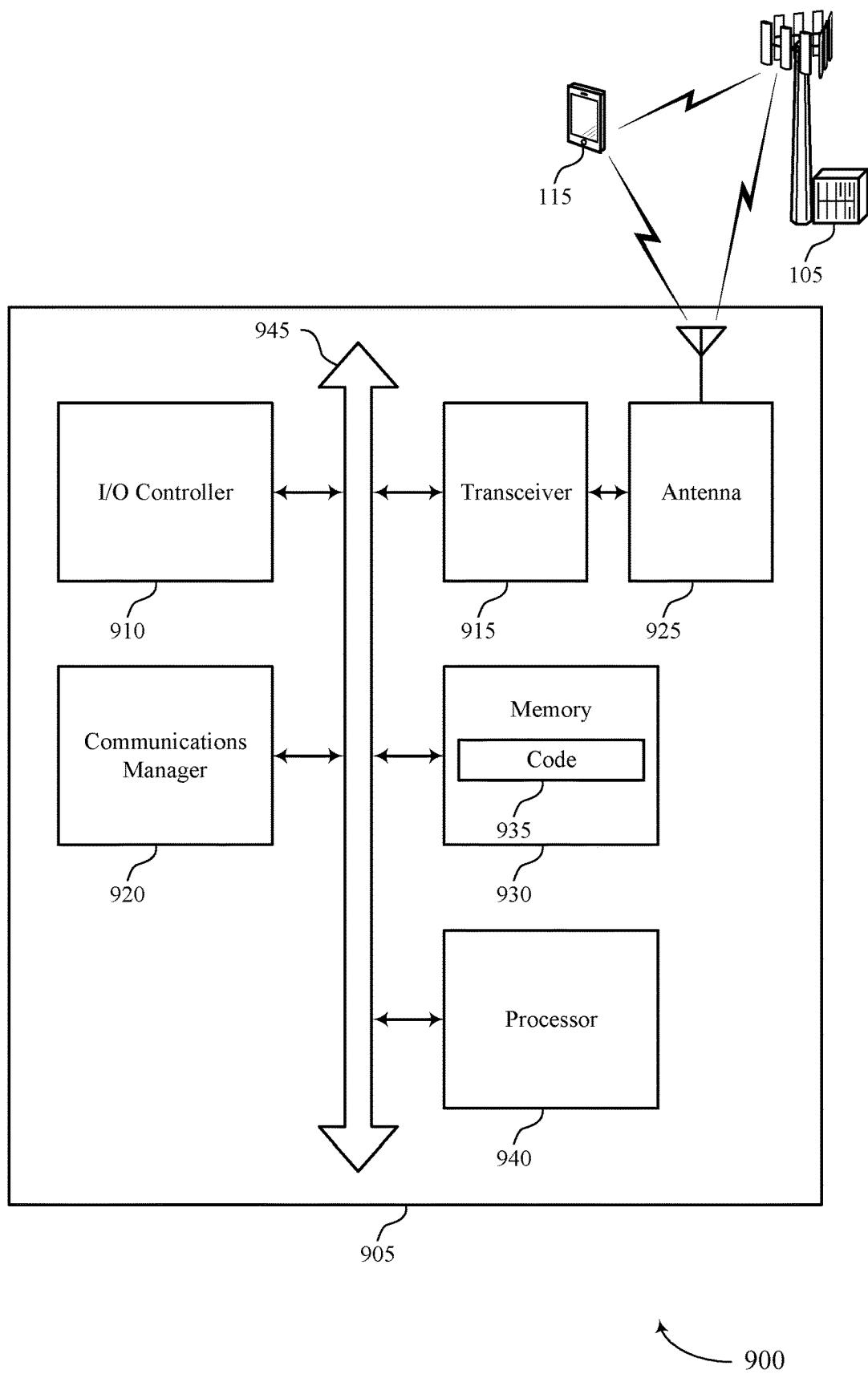
FIG. 9 shows a diagram of a system including a device that supports spatial equalization via RIS selection in accordance with one or more aspects of the present disclosure.

FIG. 9 shows a diagram of a system 900 including a device 905 that supports spatial equalization via MS selection in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting spatial equalization via RIS selection). For example, the device 905 or a component of the device 905 may include a processor 940 and memory 930 coupled with or to the processor 940, the processor 940 and memory 930 configured to perform various functions described herein.

The communications manager 920 may support wireless communications at a UE in accordance with examples as disclosed herein. For example, the communications manager 920 may be configured as or otherwise support a means for receiving a reference signal from a network entity via a wireless link between a RIS and the UE. The communications manager 920 may be configured as or otherwise support a means for determining, based on the reference signal, a value associated with a fading characteristic for the wireless link. The communications manager 920 may be configured as or otherwise support a means for transmitting, to the network entity, a message including an indication of the value associated with the fading characteristic for the wireless link.

By including or configuring the communications manager 920 in accordance with examples as described herein, the device 905 may support techniques for reduced power consumption and more efficient utilization of communication resources by allowing the UE to omit equalization or perform a simpler equalization procedure.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of spatial equalization via RIS selection as described herein, or the processor 940 and the memory 930 may be otherwise configured to perform or support such operations.

Figure 10:
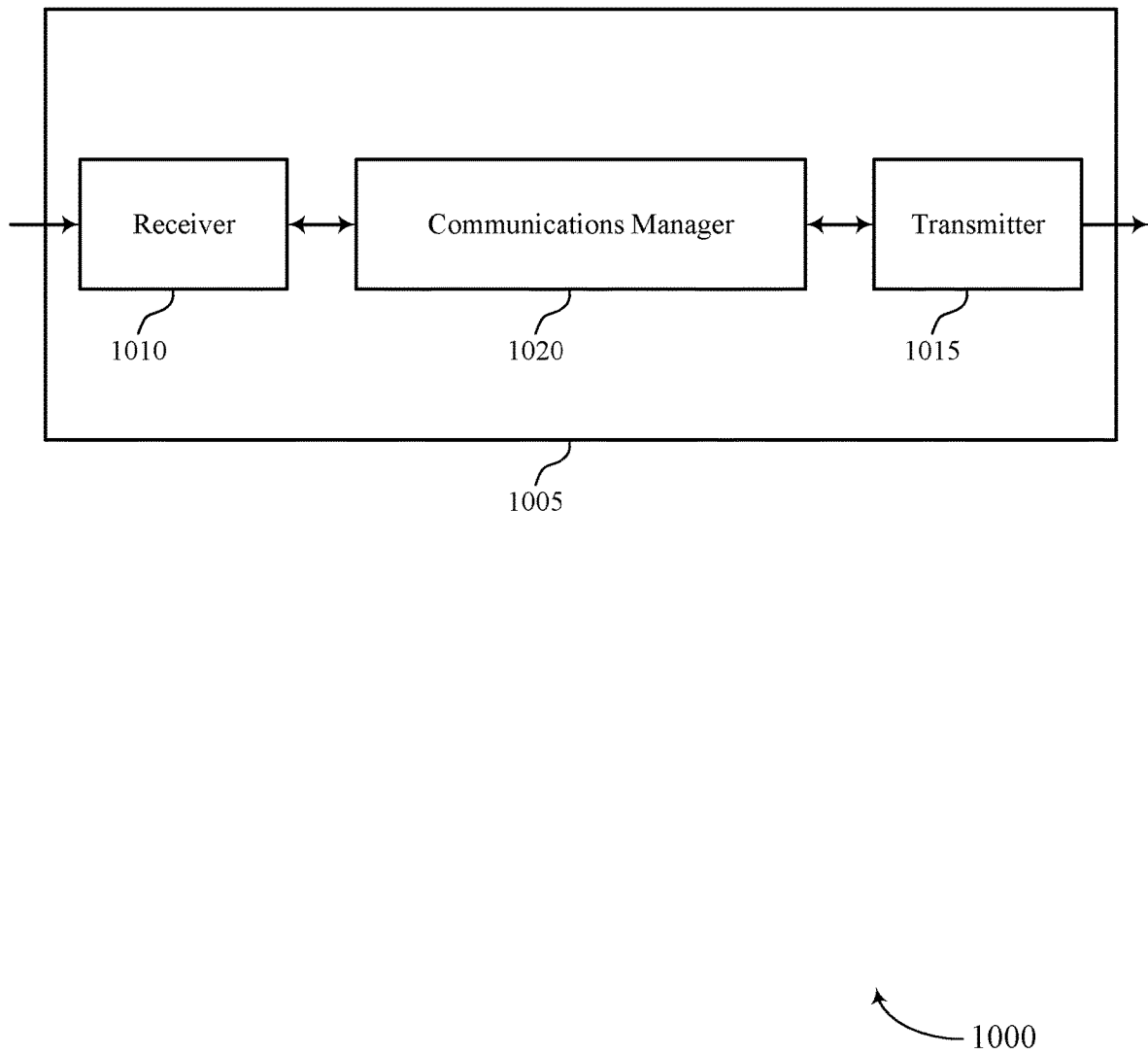
FIGS. 10 and 11 show block diagrams of devices that support spatial equalization via RIS selection in accordance with one or more aspects of the present disclosure.

FIG. 10 shows a block diagram 1000 of a device 1005 that supports spatial equalization via RIS selection in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of spatial equalization via RIS selection as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting a reference signal to a UE via a RIS. The communications manager 1020 may be configured as or otherwise support a means for receiving, from the UE at least in part in response to the reference signal, a message including an indication of a value associated with a fading characteristic for a wireless link between the RIS and the UE. The communications manager 1020 may be configured as or otherwise support a means for transmitting to the UE via the RIS based on the value associated with the fading characteristic for the wireless link.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced power consumption and more efficient utilization of communication resources by allowing a UE to omit equalization or perform a simpler equalization procedure.

Figure 11:
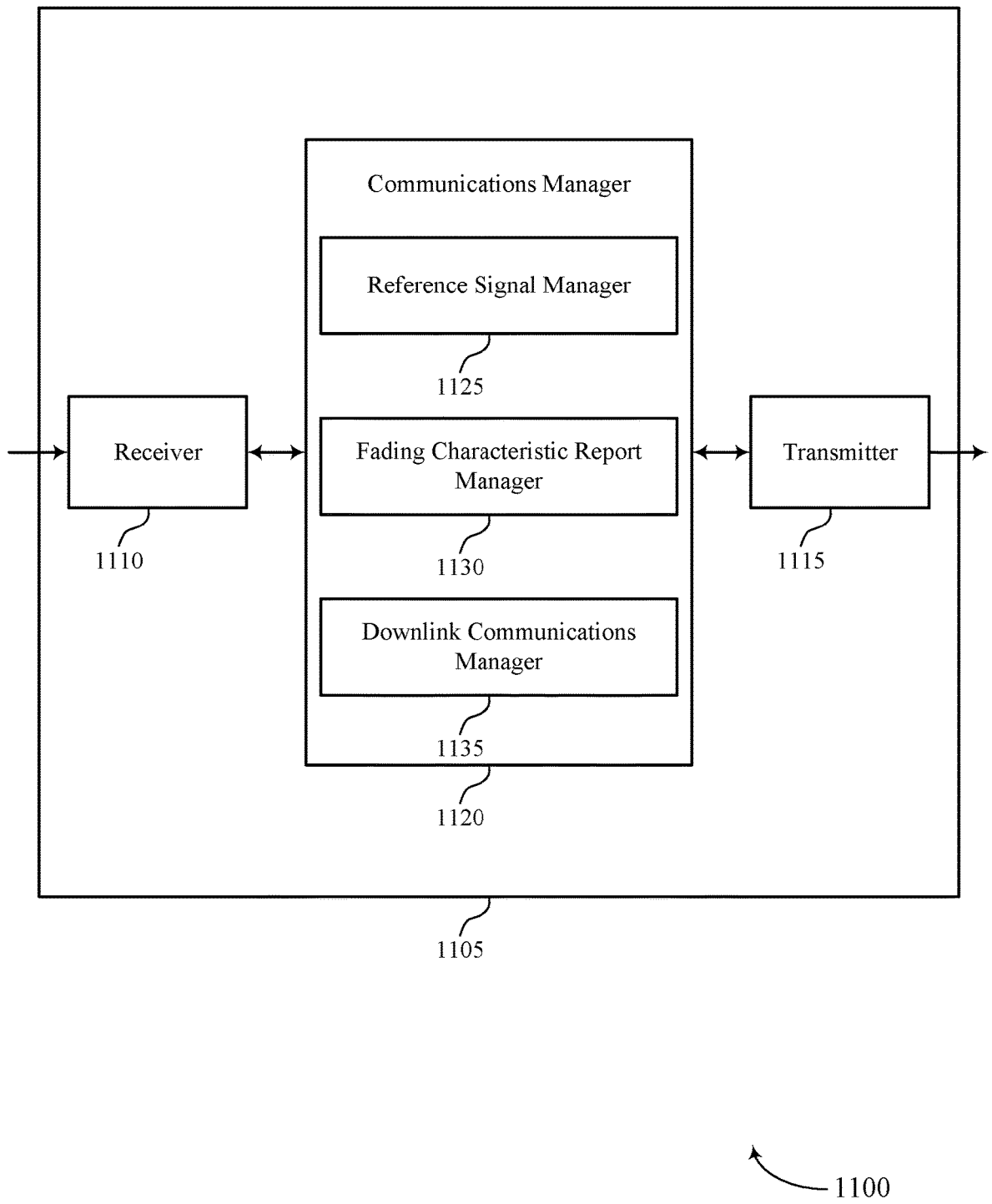

FIG. 11 shows a block diagram 1100 of a device 1105 that supports spatial equalization via RIS selection in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of spatial equalization via RIS selection as described herein. For example, the communications manager 1120 may include a reference signal manager 1125, a fading characteristic report manager 1130, a downlink communications manager 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The reference signal manager 1125 may be configured as or otherwise support a means for transmitting a reference signal to a UE via a RIS. The fading characteristic report manager 1130 may be configured as or otherwise support a means for receiving, from the UE at least in part in response to the reference signal, a message including an indication of a value associated with a fading characteristic for a wireless link between the RIS and the UE. The downlink communications manager 1135 may be configured as or otherwise support a means for transmitting to the UE via the RIS based on the value associated with the fading characteristic for the wireless link.

Figure 12:
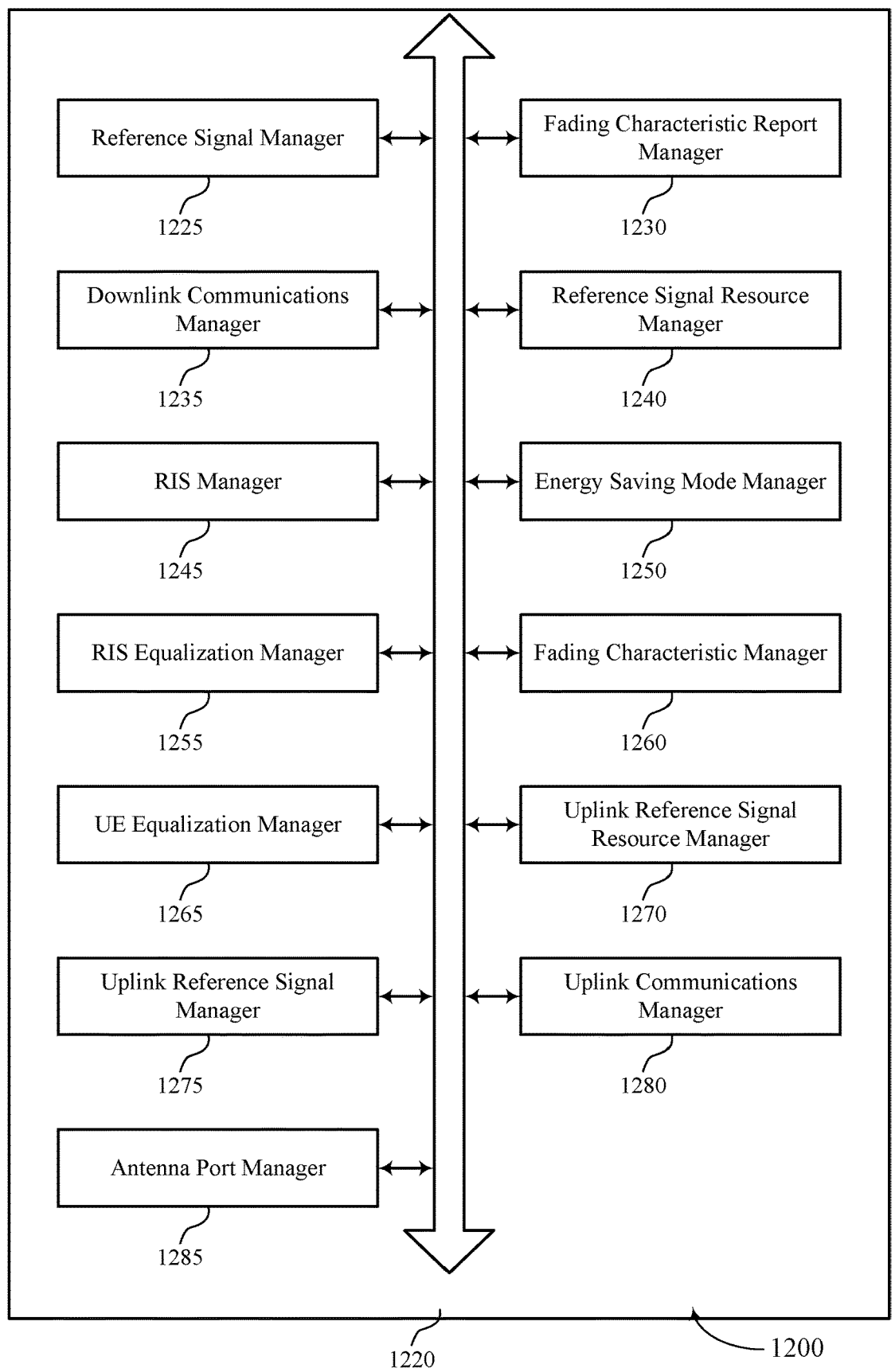
FIG. 12 shows a block diagram of a communications manager that supports spatial equalization via MS selection in accordance with one or more aspects of the present disclosure.

FIG. 12 shows a block diagram 1200 of a communications manager 1220 that supports spatial equalization via RIS selection in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of spatial equalization via RIS selection as described herein. For example, the communications manager 1220 may include a reference signal manager 1225, a fading characteristic report manager 1230, a downlink communications manager 1235, a reference signal resource manager 1240, a RIS manager 1245, an energy saving mode manager 1250, a RIS equalization manager 1255, a fading characteristic manager 1260, a UE equalization manager 1265, an uplink reference signal resource manager 1270, an uplink reference signal manager 1275, an uplink communications manager 1280, an antenna port manager 1285, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The reference signal manager 1225 may be configured as or otherwise support a means for transmitting a reference signal to a UE via a RIS. The fading characteristic report manager 1230 may be configured as or otherwise support a means for receiving, from the UE at least in part in response to the reference signal, a message including an indication of a value associated with a fading characteristic for a wireless link between the RIS and the UE. The downlink communications manager 1235 may be configured as or otherwise support a means for transmitting to the UE via the RIS based on the value associated with the fading characteristic for the wireless link.

In some examples, the reference signal resource manager 1240 may be configured as or otherwise support a means for transmitting, to the UE, control signaling indicating a set of resources for receiving the reference signal.

In some examples, the MS manager 1245 may be configured as or otherwise support a means for transmitting, to the UE at least in part in response to the indication of the value associated with the fading characteristic, control signaling indicating the RIS.

In some examples, the RIS manager 1245 may be configured as or otherwise support a means for selecting the RIS based on a location of the UE.

In some examples, the RIS manager 1245 may be configured as or otherwise support a means for selecting the RIS based on one of an angle diversity associated with the RIS and the UE, an angular position associated with the RIS and the UE, or a geometric relation associated with the RIS and the UE.

In some examples, the antenna port manager 1285 may be configured as or otherwise support a means for selecting an antenna port for transmitting the reference signal based on the RIS.

In some examples, the energy saving mode manager 1250 may be configured as or otherwise support a means for receiving, from the UE, a control message indicating that the UE is transitioning to an energy saving mode, where the reference signal is transmitted at least in part in response to the control message.

In some examples, the RIS equalization manager 1255 may be configured as or otherwise support a means for transmitting, to the RIS, a phase matrix for equalization of a second wireless link between the network entity and the RIS.

In some examples, the fading characteristic manager 1260 may be configured as or otherwise support a means for transmitting to the UE via the RIS based on the value associated with the fading characteristic being less than a threshold.

In some examples, the fading characteristic manager 1260 may be configured as or otherwise support a means for transmitting directly with the network entity based on the value associated with the fading characteristic being greater than a threshold.

In some examples, the UE equalization manager 1265 may be configured as or otherwise support a means for transmitting, to the UE, a control message indicating for the UE to apply equalization to the wireless link based on the fading characteristic being greater than a threshold.

In some examples, the uplink reference signal resource manager 1270 may be configured as or otherwise support a means for transmitting, to the UE, control signaling indicating a set of resources for transmission by the UE of a second reference signal for selection by the network entity of a second RIS for uplink communications. In some examples, the uplink reference signal manager 1275 may be configured as or otherwise support a means for receiving, from the UE via the second RIS, the second reference signal. In some examples, the uplink communications manager 1280 may be configured as or otherwise support a means for receiving uplink communications from the UE via the second RIS based on a second fading characteristic for a second wireless link between the second RIS and the network entity, the second fading characteristic based on the second reference signal.

Figure 13:
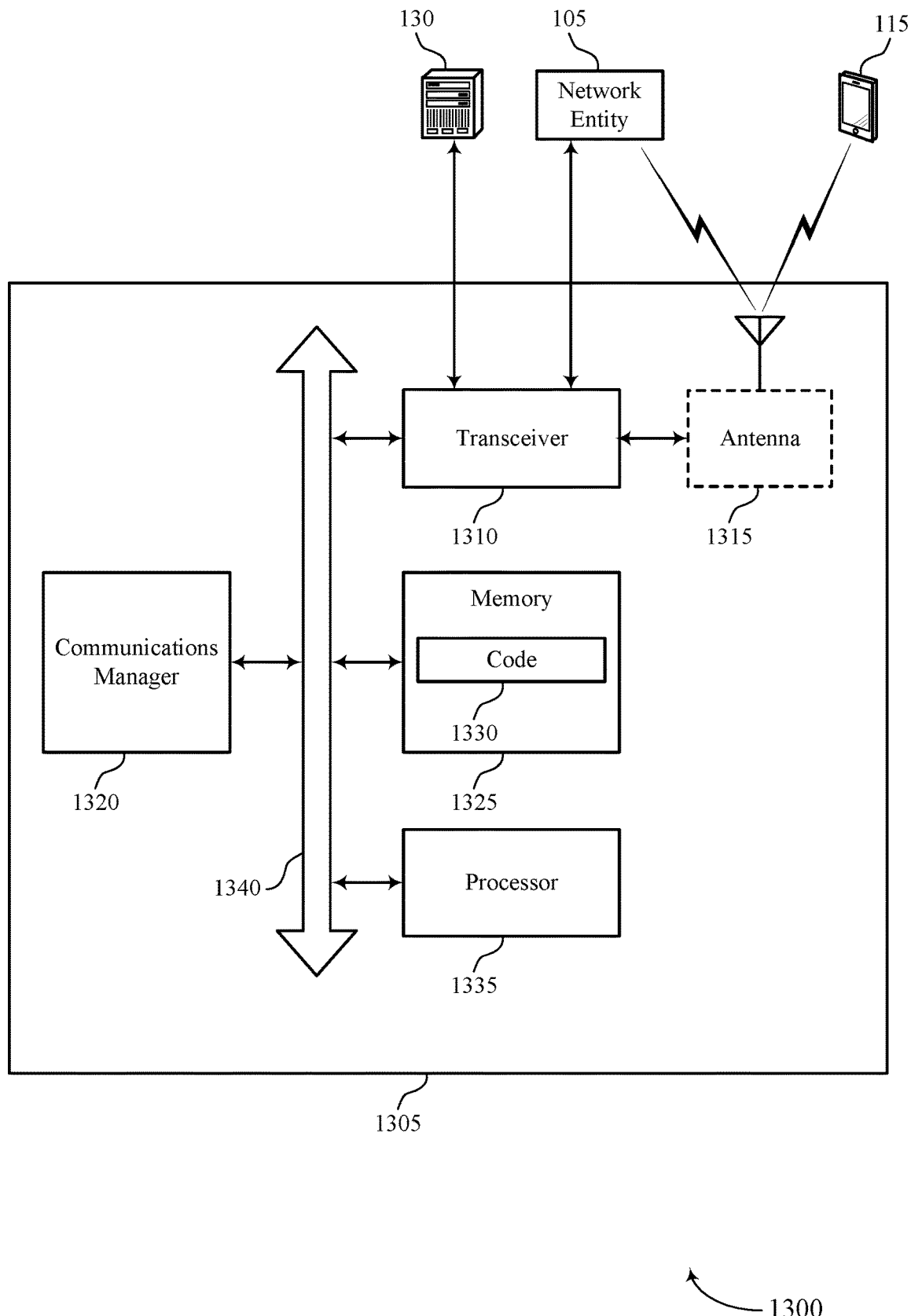
FIG. 13 shows a diagram of a system including a device that supports spatial equalization via RIS selection in accordance with one or more aspects of the present disclosure.

FIG. 13 shows a diagram of a system 1300 including a device 1305 that supports spatial equalization via RIS selection in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting spatial equalization via RIS selection). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting a reference signal to a UE via a RIS. The communications manager 1320 may be configured as or otherwise support a means for receiving, from the UE at least in part in response to the reference signal, a message including an indication of a value associated with a fading characteristic for a wireless link between the RIS and the UE. The communications manager 1320 may be configured as or otherwise support a means for transmitting to the UE via the RIS based on the value associated with the fading characteristic for the wireless link.

By including or configuring the communications manager 1320 in accordance with examples as described herein, the device 1305 may support techniques for reduced power consumption and more efficient utilization of communication resources by allowing a UE to omit equalization or perform a simpler equalization procedure.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of spatial equalization via RIS selection as described herein, or the processor 1335 and the memory 1325 may be otherwise configured to perform or support such operations.

Figure 14:
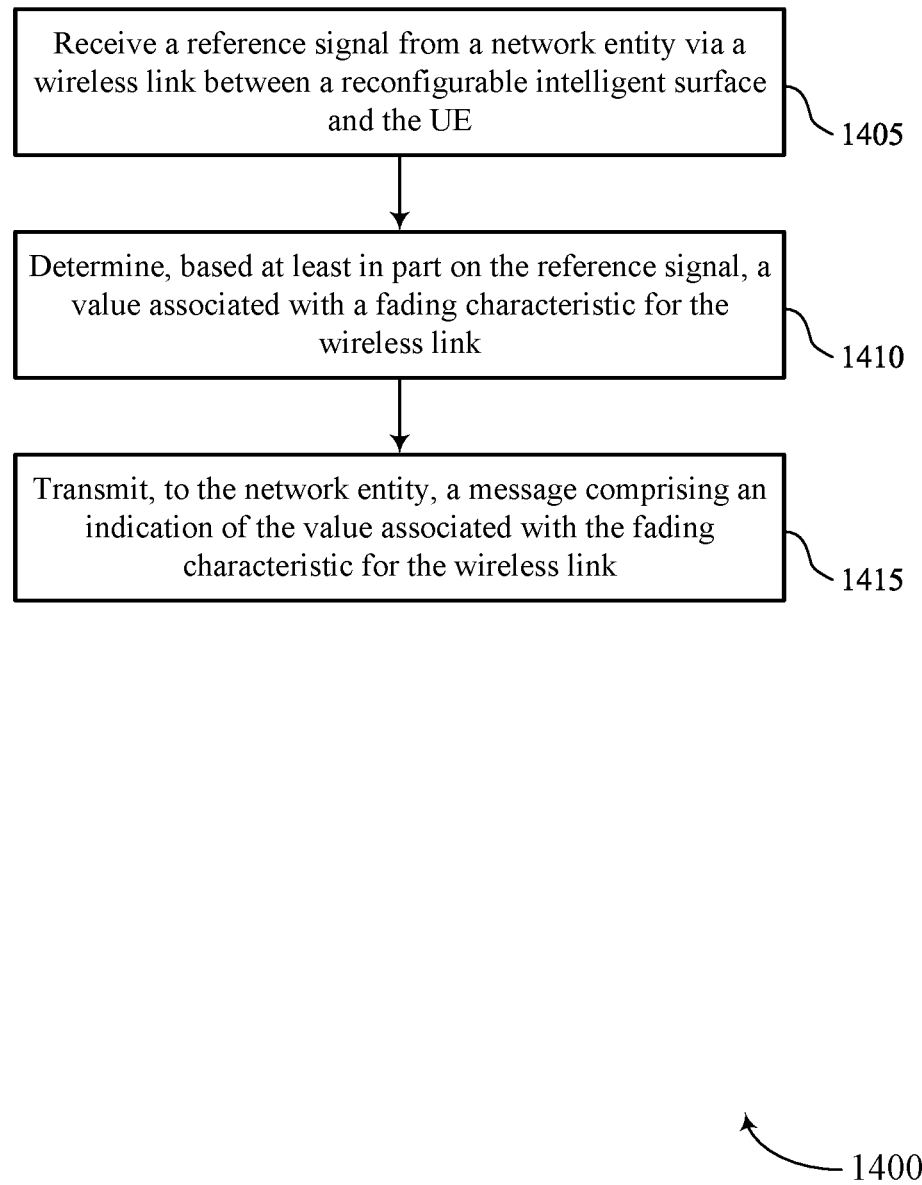
FIGS. 14 through 21 show flowcharts illustrating methods that support spatial equalization via RIS selection in accordance with one or more aspects of the present disclosure.

FIG. 14 shows a flowchart illustrating a method 1400 that supports spatial equalization via RIS selection in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a reference signal from a network entity via a wireless link between a RIS and the UE. The operations of 1405 may be performed in accordance with examples as disclosed herein. In some examples, aspects of the operations of 1405 may be performed by a reference signal manager 825 as described with reference to FIG. 8.

At 1410, the method may include determining, based on the reference signal, a value associated with a fading characteristic for the wireless link. The operations of 1410 may be performed in accordance with examples as disclosed herein. In some examples, aspects of the operations of 1410 may be performed by a fading characteristic manager 830 as described with reference to FIG. 8.

At 1415, the method may include transmitting, to the network entity, a message including an indication of the value associated with the fading characteristic for the wireless link. The operations of 1415 may be performed in accordance with examples as disclosed herein. In some examples, aspects of the operations of 1415 may be performed by a fading report manager 835 as described with reference to FIG. 8.

Figure 15:
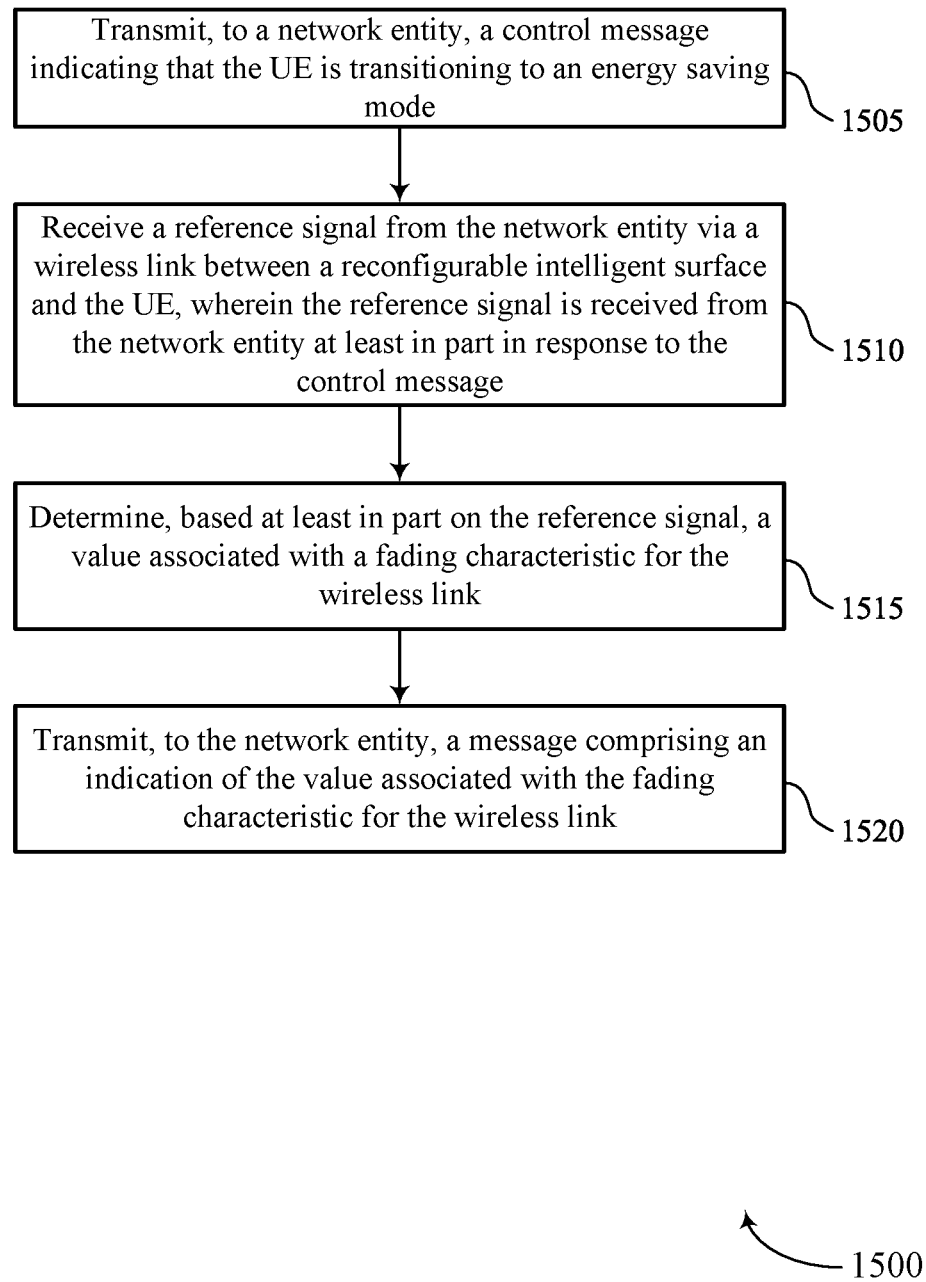

FIG. 15 shows a flowchart illustrating a method 1500 that supports spatial equalization via RIS selection in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include transmitting, to a network entity, a control message indicating that the UE is transitioning to an energy saving mode. The operations of 1505 may be performed in accordance with examples as disclosed herein. In some examples, aspects of the operations of 1505 may be performed by an energy saving mode manager 850 as described with reference to FIG. 8.

At 1510, the method may include receiving a reference signal from the network entity via a wireless link between a RIS and the UE, where the reference signal is received from the network entity at least in part in response to the control message. The operations of 1510 may be performed in accordance with examples as disclosed herein. In some examples, aspects of the operations of 1510 may be performed by a reference signal manager 825 as described with reference to FIG. 8.

At 1515, the method may include determining, based on the reference signal, a value associated with a fading characteristic for the wireless link. The operations of 1515 may be performed in accordance with examples as disclosed herein. In some examples, aspects of the operations of 1515 may be performed by a fading characteristic manager 830 as described with reference to FIG. 8.

At 1520, the method may include transmitting, to the network entity, a message including an indication of the value associated with the fading characteristic for the wireless link. The operations of 1520 may be performed in accordance with examples as disclosed herein. In some examples, aspects of the operations of 1520 may be performed by a fading report manager 835 as described with reference to FIG. 8.

Figure 16:
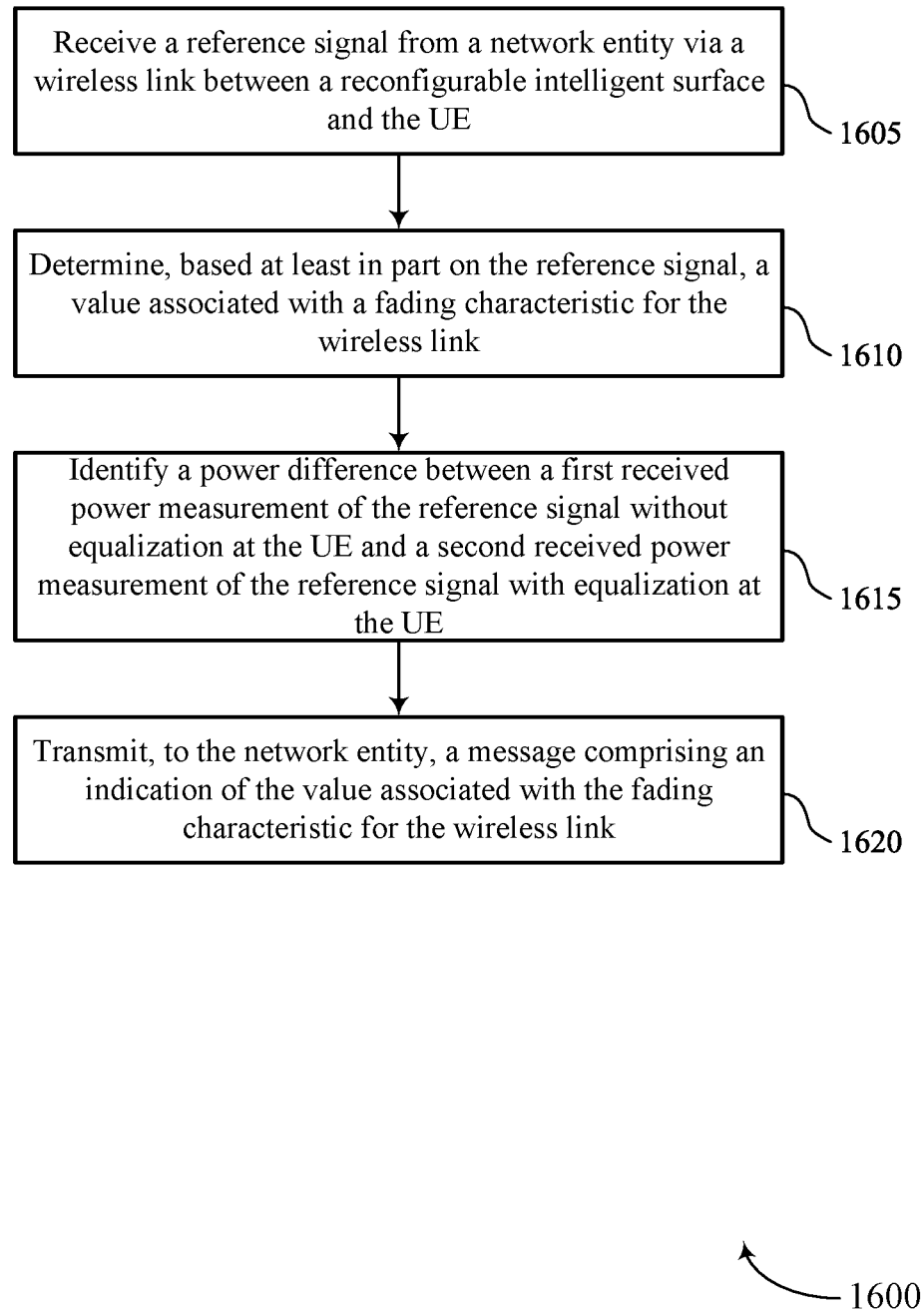

FIG. 16 shows a flowchart illustrating a method 1600 that supports spatial equalization via RIS selection in accordance with one or more aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving a reference signal from a network entity via a wireless link between a RIS and the UE. The operations of 1605 may be performed in accordance with examples as disclosed herein. In some examples, aspects of the operations of 1605 may be performed by a reference signal manager 825 as described with reference to FIG. 8.

At 1610, the method may include determining, based on the reference signal, a value associated with a fading characteristic for the wireless link. The operations of 1610 may be performed in accordance with examples as disclosed herein. In some examples, aspects of the operations of 1610 may be performed by a fading characteristic manager 830 as described with reference to FIG. 8.

At 1615, the method may include identifying a power difference between a first received power measurement of the reference signal without equalization at the UE and a second received power measurement of the reference signal with equalization at the UE. The operations of 1615 may be performed in accordance with examples as disclosed herein. In some examples, aspects of the operations of 1615 may be performed by a power difference manager 855 as described with reference to FIG. 8.

At 1620, the method may include transmitting, to the network entity, a message including an indication of the value associated with the fading characteristic for the wireless link. The operations of 1620 may be performed in accordance with examples as disclosed herein. In some examples, aspects of the operations of 1620 may be performed by a fading report manager 835 as described with reference to FIG. 8.

Figure 17:
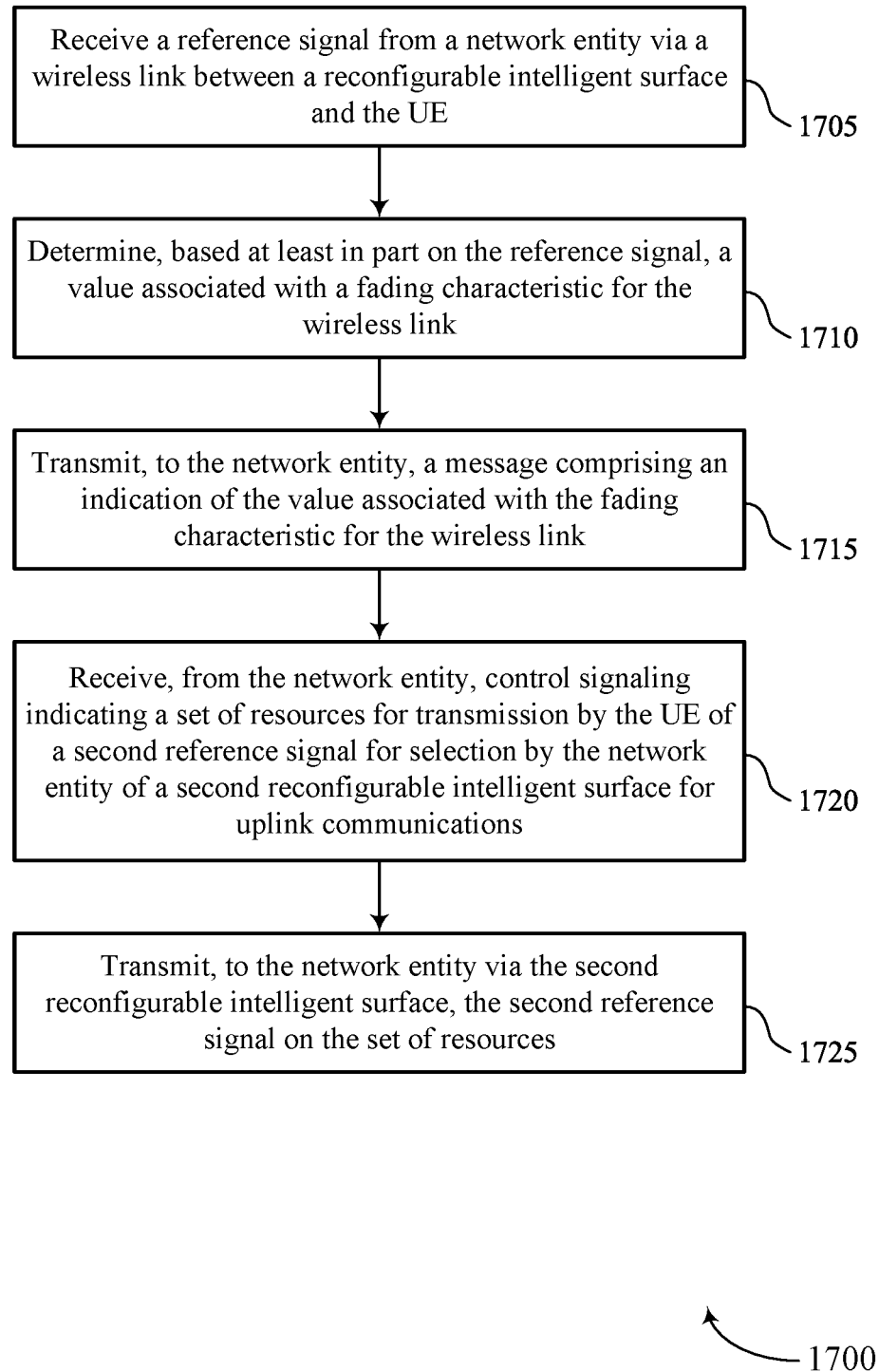

FIG. 17 shows a flowchart illustrating a method 1700 that supports spatial equalization via RIS selection in accordance with one or more aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1705, the method may include receiving a reference signal from a network entity via a wireless link between a RIS and the UE. The operations of 1705 may be performed in accordance with examples as disclosed herein. In some examples, aspects of the operations of 1705 may be performed by a reference signal manager 825 as described with reference to FIG. 8.

At 1710, the method may include determining, based on the reference signal, a value associated with a fading characteristic for the wireless link. The operations of 1710 may be performed in accordance with examples as disclosed herein. In some examples, aspects of the operations of 1710 may be performed by a fading characteristic manager 830 as described with reference to FIG. 8.

At 1715, the method may include transmitting, to the network entity, a message including an indication of the value associated with the fading characteristic for the wireless link. The operations of 1715 may be performed in accordance with examples as disclosed herein. In some examples, aspects of the operations of 1715 may be performed by a fading report manager 835 as described with reference to FIG. 8.

At 1720, the method may include receiving, from the network entity, control signaling indicating a set of resources for transmission by the UE of a second reference signal for selection by the network entity of a second RIS for uplink communications. The operations of 1720 may be performed in accordance with examples as disclosed herein. In some examples, aspects of the operations of 1720 may be performed by an uplink reference signal resource manager 865 as described with reference to FIG. 8.

At 1725, the method may include transmitting, to the network entity via the second RIS, the second reference signal on the set of resources. The operations of 1725 may be performed in accordance with examples as disclosed herein. In some examples, aspects of the operations of 1725 may be performed by an uplink reference signal manager 870 as described with reference to FIG. 8.

Figure 18:
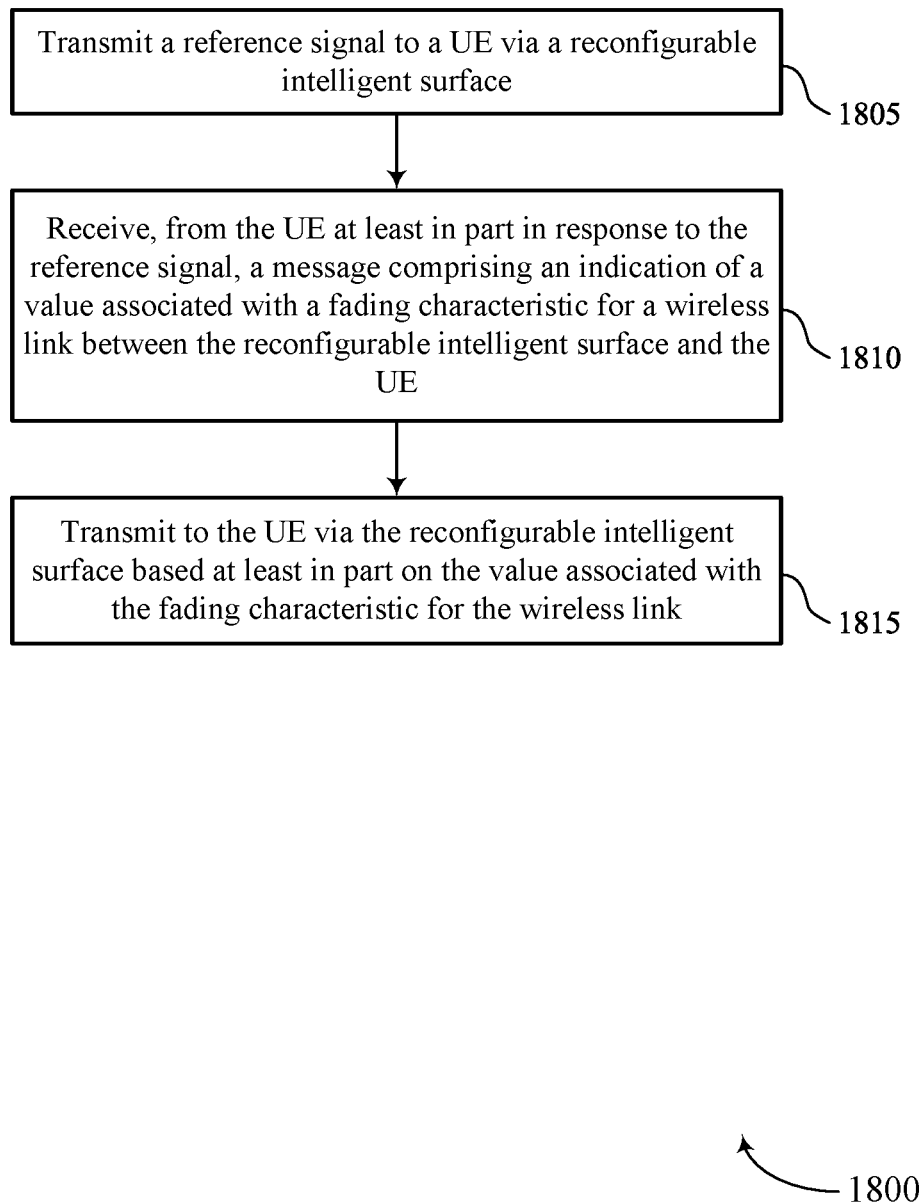

FIG. 18 shows a flowchart illustrating a method 1800 that supports spatial equalization via RIS selection in accordance with one or more aspects of the present disclosure. The operations of the method 1800 may be implemented by a network entity or its components as described herein. For example, the operations of the method 1800 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1805, the method may include transmitting a reference signal to a UE via a MS. The operations of 1805 may be performed in accordance with examples as disclosed herein. In some examples, aspects of the operations of 1805 may be performed by a reference signal manager 1225 as described with reference to FIG. 12.

At 1810, the method may include receiving, from the UE at least in part in response to the reference signal, a message including an indication of a value associated with a fading characteristic for a wireless link between the MS and the UE. The operations of 1810 may be performed in accordance with examples as disclosed herein. In some examples, aspects of the operations of 1810 may be performed by a fading characteristic report manager 1230 as described with reference to FIG. 12.

At 1815, the method may include transmitting to the UE via the MS based on the value associated with the fading characteristic for the wireless link. The operations of 1815 may be performed in accordance with examples as disclosed herein. In some examples, aspects of the operations of 1815 may be performed by a downlink communications manager 1235 as described with reference to FIG. 12.

Figure 19:
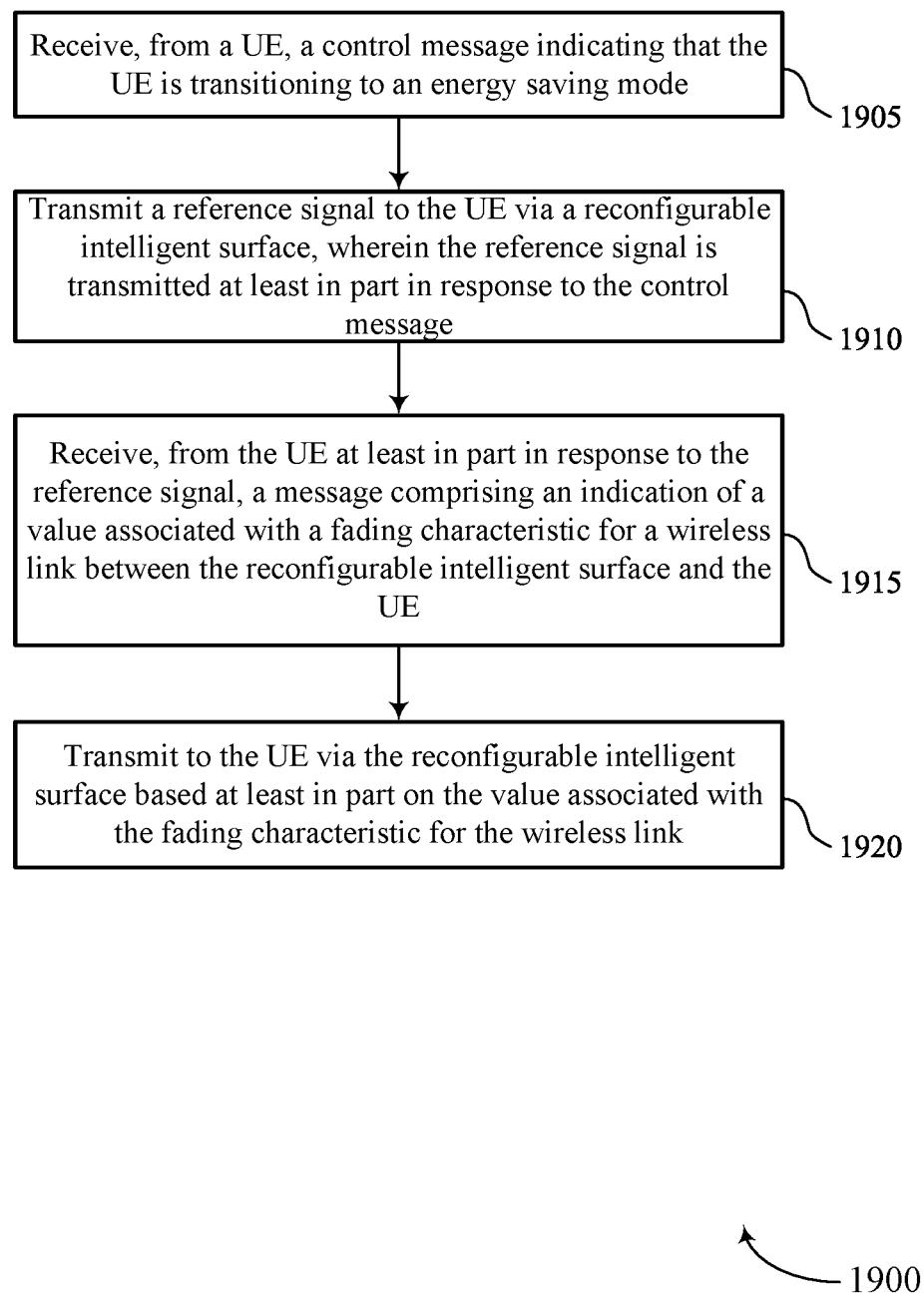

FIG. 19 shows a flowchart illustrating a method 1900 that supports spatial equalization via RIS selection in accordance with one or more aspects of the present disclosure. The operations of the method 1900 may be implemented by a network entity or its components as described herein. For example, the operations of the method 1900 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1905, the method may include receiving, from a UE, a control message indicating that the UE is transitioning to an energy saving mode. The operations of 1905 may be performed in accordance with examples as disclosed herein. In some examples, aspects of the operations of 1905 may be performed by an energy saving mode manager 1250 as described with reference to FIG. 12.

At 1910, the method may include transmitting a reference signal to the UE via a RIS, where the reference signal is transmitted at least in part in response to the control message. The operations of 1910 may be performed in accordance with examples as disclosed herein. In some examples, aspects of the operations of 1910 may be performed by a reference signal manager 1225 as described with reference to FIG. 12.

At 1915, the method may include receiving, from the UE at least in part in response to the reference signal, a message including an indication of a value associated with a fading characteristic for a wireless link between the RIS and the UE. The operations of 1915 may be performed in accordance with examples as disclosed herein. In some examples, aspects of the operations of 1915 may be performed by a fading characteristic report manager 1230 as described with reference to FIG. 12.

At 1920, the method may include transmitting to the UE via the MS based on the value associated with the fading characteristic for the wireless link. The operations of 1920 may be performed in accordance with examples as disclosed herein. In some examples, aspects of the operations of 1920 may be performed by a downlink communications manager 1235 as described with reference to FIG. 12.

Figure 20:
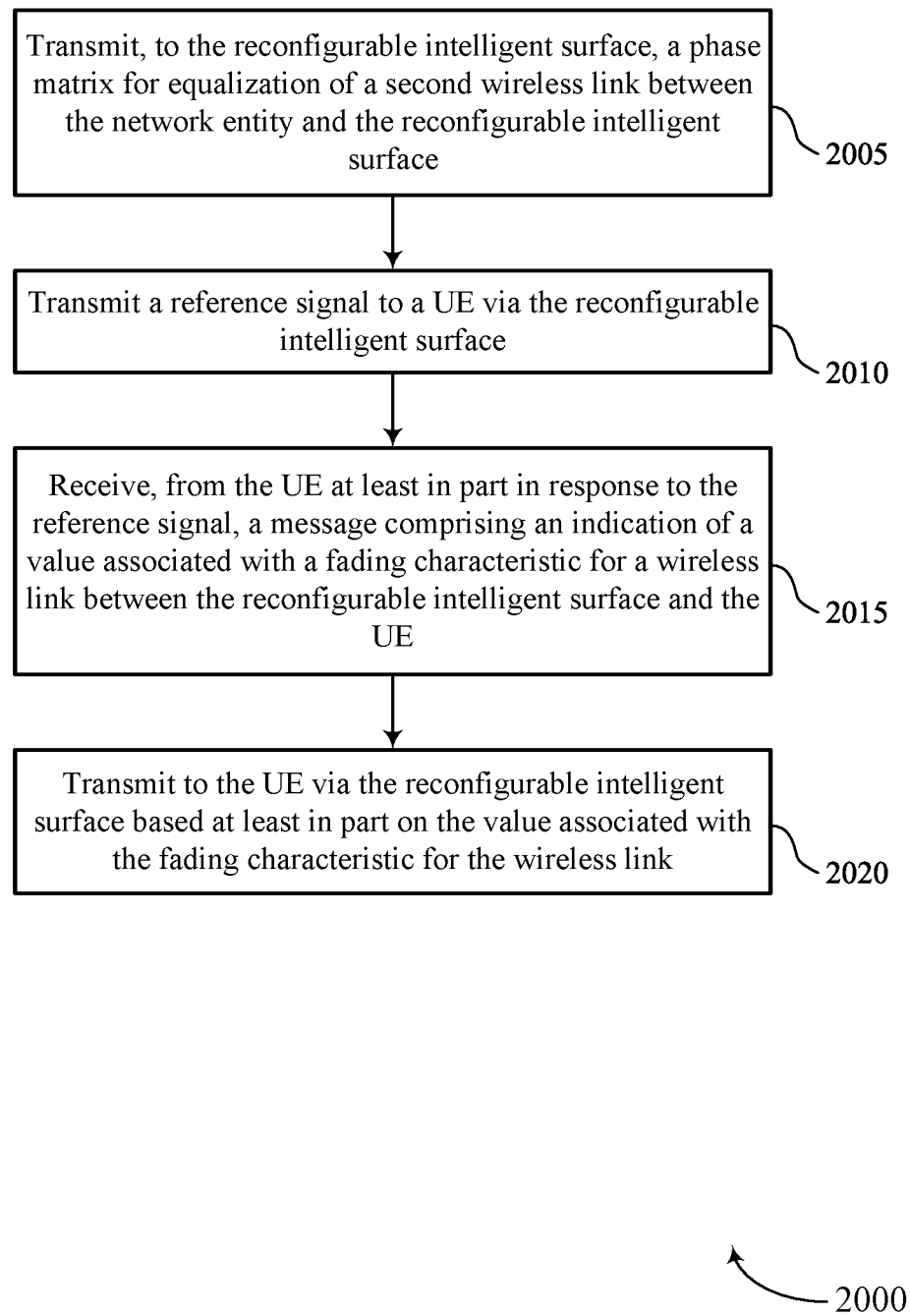

FIG. 20 shows a flowchart illustrating a method 2000 that supports spatial equalization via RIS selection in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting, to a RIS, a phase matrix for equalization of a second wireless link between the network entity and the RIS. The operations of 2005 may be performed in accordance with examples as disclosed herein. In some examples, aspects of the operations of 2005 may be performed by a RIS equalization manager 1255 as described with reference to FIG. 12.

At 2010, the method may include transmitting a reference signal to a UE via the MS. The operations of 2010 may be performed in accordance with examples as disclosed herein. In some examples, aspects of the operations of 2010 may be performed by a reference signal manager 1225 as described with reference to FIG. 12.

At 2015, the method may include receiving, from the UE at least in part in response to the reference signal, a message including an indication of a value associated with a fading characteristic for a wireless link between the MS and the UE. The operations of 2015 may be performed in accordance with examples as disclosed herein. In some examples, aspects of the operations of 2015 may be performed by a fading characteristic report manager 1230 as described with reference to FIG. 12.

At 2020, the method may include transmitting to the UE via the MS based on the value associated with the fading characteristic for the wireless link. The operations of 2020 may be performed in accordance with examples as disclosed herein. In some examples, aspects of the operations of 2020 may be performed by a downlink communications manager 1235 as described with reference to FIG. 12.

Figure 21:
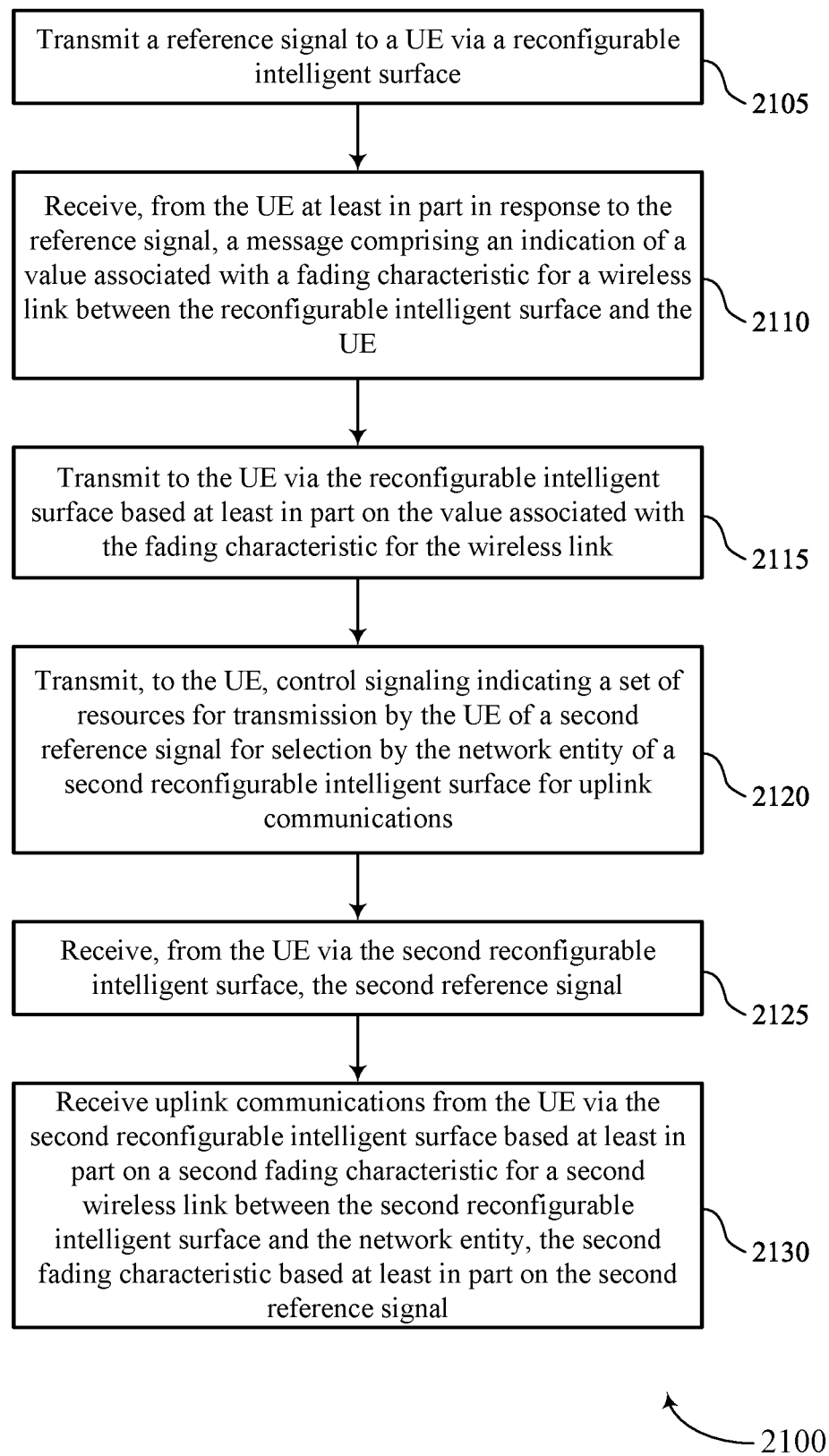

FIG. 21 shows a flowchart illustrating a method 2100 that supports spatial equalization via RIS selection in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting a reference signal to a UE via a RIS. The operations of 2105 may be performed in accordance with examples as disclosed herein. In some examples, aspects of the operations of 2105 may be performed by a reference signal manager 1225 as described with reference to FIG. 12.

At 2110, the method may include receiving, from the UE at least in part in response to the reference signal, a message including an indication of a value associated with a fading characteristic for a wireless link between the RIS and the UE. The operations of 2110 may be performed in accordance with examples as disclosed herein. In some examples, aspects of the operations of 2110 may be performed by a fading characteristic report manager 1230 as described with reference to FIG. 12.

At 2115, the method may include transmitting to the UE via the MS based on the value associated with the fading characteristic for the wireless link. The operations of 2115 may be performed in accordance with examples as disclosed herein. In some examples, aspects of the operations of 2115 may be performed by a downlink communications manager 1235 as described with reference to FIG. 12.

At 2120, the method may include transmitting, to the UE, control signaling indicating a set of resources for transmission by the UE of a second reference signal for selection by the network entity of a second MS for uplink communications. The operations of 2120 may be performed in accordance with examples as disclosed herein. In some examples, aspects of the operations of 2120 may be performed by an uplink reference signal resource manager 1270 as described with reference to FIG. 12.

At 2125, the method may include receiving, from the UE via the second MS, the second reference signal. The operations of 2125 may be performed in accordance with examples as disclosed herein. In some examples, aspects of the operations of 2125 may be performed by an uplink reference signal manager 1275 as described with reference to FIG. 12.

At 2130, the method may include receiving uplink communications from the UE via the second RIS based on a second fading characteristic for a second wireless link between the second RIS and the network entity, the second fading characteristic based on the second reference signal. The operations of 2130 may be performed in accordance with examples as disclosed herein. In some examples, aspects of the operations of 2130 may be performed by an uplink communications manager 1280 as described with reference to FIG. 12.

The following provides an overview of aspects of the present disclosure:

Aspect 1: A method for wireless communications at a UE, comprising: receiving a reference signal from a network entity via a wireless link between a RIS and the UE; determining, based at least in part on the reference signal, a value associated with a fading characteristic for the wireless link; and transmitting, to the network entity, a message comprising an indication of the value associated with the fading characteristic for the wireless link.

Aspect 2: The method of aspect 1, further comprising: receiving, from the network entity, control signaling indicating a set of resources for receiving the reference signal.

Aspect 3: The method of any of aspects 1 through 2, further comprising: receiving, from the network entity at least in part in response to the indication of the value associated with the fading characteristic, control signaling indicating the MS.

Aspect 4: The method of any of aspects 1 through 3, further comprising: transmitting, to the network entity, a control message indicating that the UE is transitioning to an energy saving mode, wherein the reference signal is received from the network entity at least in part in response to the control message.

Aspect 5: The method of aspect 4, further comprising: transitioning to the energy saving mode based at least in part on one of a remaining battery life of the UE or a change of serving carrier frequency band.

Aspect 6: The method of any of aspects 4 through 5, further comprising: communicating with the network entity via a first transmit beam prior to transmitting the control message, wherein the reference signal is received via a second transmit beam.

Aspect 7: The method of any of aspects 1 through 6, wherein determining the value associated with the fading characteristic comprises: identifying a power difference between a first received power measurement of the reference signal without equalization at the UE and a second received power measurement of the reference signal with equalization at the UE.

Aspect 8: The method of any of aspects 1 through 7, further comprising: applying a first equalization process at the UE to communicate directly with the network entity; and applying a second equalization process at the UE to communicate with the network entity via the RIS, the second equalization process different from the first equalization process and based at least in part on the fading characteristic.

Aspect 9: The method of aspect 8, wherein the second equalization process comprises an absence of an equalization process at the UE to communicate with the network entity.

Aspect 10: The method of any of aspects 8 through 9, wherein the second equalization process is associated with a simplified equalization process relative to the first equalization process.

Aspect 11: The method of any of aspects 1 through 10, further comprising: receiving, from the network entity, control signaling indicating a set of resources for transmission by the UE of a second reference signal for selection by the network entity of a second RIS for uplink communications; and transmitting, to the network entity via the second RIS, the second reference signal on the set of resources.

Aspect 12: The method of any of aspects 1 through 11, wherein the reference signal comprises a preamble sequence.

Aspect 13: A method for wireless communications at a network entity, comprising: transmitting a reference signal to a UE via a RIS; receiving, from the UE at least in part in response to the reference signal, a message comprising an indication of a value associated with a fading characteristic for a wireless link between the RIS and the UE; and transmitting to the UE via the RIS based at least in part on the value associated with the fading characteristic for the wireless link.

Aspect 14: The method of aspect 13, further comprising: transmitting, to the UE, control signaling indicating a set of resources for receiving the reference signal.

Aspect 15: The method of any of aspects 13 through 14, further comprising: transmitting, to the UE at least in part in response to the indication of the value associated with the fading characteristic, control signaling indicating the RIS.

Aspect 16: The method of aspect 15, further comprising: selecting the RIS based at least in part on a location of the UE.

Aspect 17: The method of any of aspects 15 through 16, further comprising: selecting the RIS based at least in part on one of an angle diversity associated with the RIS and the UE, an angular position associated with the RIS and the UE, or a geometric relation associated with the RIS and the UE.

Aspect 18: The method of any of aspects 15 through 17, further comprising: selecting an antenna port for transmitting the reference signal based at least in part on the RIS.

Aspect 19: The method of any of aspects 13 through 18, further comprising: receiving, from the UE, a control message indicating that the UE is transitioning to an energy saving mode, wherein the reference signal is transmitted at least in part in response to the control message.

Aspect 20: The method of any of aspects 13 through 19, further comprising: transmitting, to the RIS, a phase matrix for equalization of a second wireless link between the network entity and the RIS.

Aspect 21: The method of any of aspects 13 through 20, further comprising: transmitting to the UE via the RIS based at least in part on the value associated with the fading characteristic being less than a threshold.

Aspect 22: The method of any of aspects 13 through 21, further comprising: transmitting directly with the UE based at least in part on the value associated with the fading characteristic being greater than a threshold.

Aspect 23: The method of any of aspects 13 through 22, further comprising: transmitting, to the UE, a control message indicating for the UE to apply equalization to the wireless link based at least in part on the fading characteristic being greater than a threshold.

Aspect 24: The method of any of aspects 13 through 23, further comprising: transmitting, to the UE, control signaling indicating a set of resources for transmission by the UE of a second reference signal for selection by the network entity of a second RIS for uplink communications; receiving, from the UE via the second RIS, the second reference signal; and receiving uplink communications from the UE via the second RIS based at least in part on a second fading characteristic for a second wireless link between the second RIS and the network entity, the second fading characteristic based at least in part on the second reference signal.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a network entity, comprising a processor; memory coupled with the processor; and instructions stored in the memory and executable by the processor to cause the apparatus to perform a method of any of aspects 13 through 24.

Aspect 29: An apparatus for wireless communications at a network entity, comprising at least one means for performing a method of any of aspects 13 through 24.

Aspect 30: A non-transitory computer-readable medium storing code for wireless communications at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving a reference signal from a network entity via a wireless link between a reconfigurable intelligent surface and the UE;

determining, based at least in part on the reference signal, a value associated with a multipath fading characteristic for the wireless link, wherein determining the value associated with the multipath fading characteristic comprises identifying a power difference between a first received power measurement of the reference signal without equalization at the UE and a second received power measurement of the reference signal with equalization at the UE; and transmitting, to the network entity, a message comprising an indication of the value associated with the multipath fading characteristic for the wireless link.

2. The method of claim 1, further comprising:
receiving, from the network entity, control signaling indicating a set of resources for receiving the reference signal.

3. The method of claim 1, further comprising:
receiving, from the network entity at least in part in response to the indication of the value associated with the multipath fading characteristic, control signaling indicating the reconfigurable intelligent surface.

4. The method of claim 1, further comprising:
transmitting, to the network entity, a control message indicating that the UE is transitioning to an energy saving mode, wherein the reference signal is received from the network entity at least in part in response to the control message.

5. The method of claim 4, further comprising:
transitioning to the energy saving mode based at least in part on one of a remaining battery life of the UE or a change of serving carrier frequency band.

6. The method of claim 4, further comprising:
communicating with the network entity via a first transmit beam prior to transmitting the control message, wherein the reference signal is received via a second transmit beam.

7. The method of claim 1, further comprising:
applying a first equalization process at the UE to communicate directly with the network entity; and
applying a second equalization process at the UE to communicate with the network entity via the reconfigurable intelligent surface, the second equalization process different from the first equalization process and based at least in part on the multipath fading characteristic.

8. The method of claim 7, wherein the second equalization process comprises an absence of an equalization process at the UE to communicate with the network entity.

9. The method of claim 7, wherein the second equalization process is associated with a simplified equalization process relative to the first equalization process.

10. The method of claim 1, further comprising:
receiving, from the network entity, control signaling indicating a set of resources for transmission by the UE of a second reference signal for selection by the network entity of a second reconfigurable intelligent surface for uplink communications; and
transmitting, to the network entity via the second reconfigurable intelligent surface, the second reference signal on the set of resources.

11. The method of claim 1, wherein the reference signal comprises a preamble sequence.

12. The method of claim 1, wherein the value associated with the multipath fading characteristic is indicative of a flatness of the wireless link across a set of frequencies.

13. A method for wireless communications at a network entity, comprising:
transmitting a reference signal to a user equipment (UE) via a reconfigurable intelligent surface;
receiving, from the UE at least in part in response to the reference signal, a message comprising an indication of a value associated with a fading characteristic for a wireless link between the reconfigurable intelligent surface and the UE; and
transmitting to the UE, wherein transmitting to the UE comprises:

transmitting a downlink transmission to the UE via the reconfigurable intelligent surface when the value associated with the fading characteristic is less than a threshold; and
transmitting the downlink transmission directly to the UE when the value associated with the fading characteristic is greater than the threshold.

14. The method of claim 13, further comprising:
transmitting, to the UE, control signaling indicating a set of resources for receiving the reference signal.

15. The method of claim 13, further comprising:
transmitting, to the UE at least in part in response to the indication of the value associated with the fading characteristic, control signaling indicating the reconfigurable intelligent surface.

16. The method of claim 15, further comprising:
selecting the reconfigurable intelligent surface based at least in part on a location of the UE.

17. The method of claim 15, further comprising:
selecting the reconfigurable intelligent surface based at least in part on one of an angle diversity associated with the reconfigurable intelligent surface and the UE, an angular position associated with the reconfigurable intelligent surface and the UE, or a geometric relation associated with the reconfigurable intelligent surface and the UE.

18. The method of claim 15, further comprising:
selecting an antenna port for transmitting the reference signal based at least in part on the reconfigurable intelligent surface.

19. The method of claim 13, further comprising:
receiving, from the UE, a control message indicating that the UE is transitioning to an energy saving mode, wherein the reference signal is transmitted at least in part in response to the control message.

20. The method of claim 13, further comprising:
transmitting, to the reconfigurable intelligent surface, a phase matrix for equalization of a second wireless link between the network entity and the reconfigurable intelligent surface.

21. The method of claim 13, further comprising:
transmitting, to the UE, control signaling indicating a set of resources for transmission by the UE of a second reference signal for selection by the network entity of a second reconfigurable intelligent surface for uplink communications;
receiving, from the UE via the second reconfigurable intelligent surface, the second reference signal; and
receiving uplink communications from the UE via the second reconfigurable intelligent surface based at least in part on a second fading characteristic for a second wireless link between the second reconfigurable intelligent surface and the network entity, the second fading characteristic based at least in part on the second reference signal.

22. The method of claim 13, wherein the value associated with the fading characteristic is indicative of a power difference between a first received power measurement of the reference signal without equalization at the UE and a second received power measurement of the reference signal with equalization at the UE.

23. A method for wireless communications at a network entity, comprising:
transmitting a reference signal to a user equipment (UE) via a reconfigurable intelligent surface;
receiving, from the UE at least in part in response to the reference signal, a message comprising an indication of a value associated with a fading characteristic for a wireless link between the reconfigurable intelligent surface and the UE;

transmitting, to the UE, a control message, wherein the control message indicates for the UE to apply equalization to the wireless link when the fading characteristic is greater than a threshold, and wherein the control message indicates for the UE to refrain from applying equalization when the fading characteristic is less than the threshold; and transmitting to the UE via the reconfigurable intelligent surface based at least in part on the value associated with the fading characteristic for the wireless link.

24. An apparatus for wireless communications at a user equipment (UE), comprising:

a processor;

memory coupled with the processor; and instructions stored in the memory and executable by the processor to cause the apparatus to:

receive a reference signal from a network entity via a wireless link between a reconfigurable intelligent surface and the UE;

determine, based at least in part on the reference signal, a value associated with a multipath fading characteristic for the wireless link, wherein to determine the value associated with the multipath fading characteristic the apparatus is configured to identify a power difference between a first received power measurement of the reference signal without equalization at the UE and a second received power measurement of the reference signal with equalization at the UE; and transmit, to the network entity, a message comprising an indication of the value associated with the multipath fading characteristic for the wireless link.

25. The apparatus of claim 24, wherein the instructions are further executable by the processor to cause the apparatus to:

receive, from the network entity, control signaling indicating a set of resources for receiving the reference signal.

26. The apparatus of claim 24, wherein the instructions are further executable by the processor to cause the apparatus to:

receive, from the network entity at least in part in response to the indication of the value associated with the multipath fading characteristic, control signaling indicating the reconfigurable intelligent surface.

27. The apparatus of claim 24, wherein the instructions are further executable by the processor to cause the apparatus to:

transmit, to the network entity, a control message indicating that the UE is transitioning to an energy saving mode, wherein the reference signal is received from the network entity at least in part in response to the control message.

28. The apparatus of claim 27, wherein the instructions are further executable by the processor to cause the apparatus to:

transition to the energy saving mode based at least in part on one of a remaining battery life of the UE or a change of serving carrier frequency band.

29. The apparatus of claim 27, wherein the instructions are further executable by the processor to cause the apparatus to:

communicate with the network entity via a first transmit beam prior to transmitting the control message, wherein the reference signal is received via a second transmit beam.

30. The apparatus of claim 24, wherein the value associated with the multipath fading characteristic is indicative of a flatness of the wireless link across a set of frequencies.

* * * * *